(12) United States Patent
Koga

(10) Patent No.: US 10,078,914 B2
(45) Date of Patent: Sep. 18, 2018

(54) SETTING METHOD AND INFORMATION PROCESSING DEVICE

(71) Applicant: FUJITSU LIMITED, Kawasaki-shi, Kanagawa (JP)

(72) Inventor: Susumu Koga, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/450,707

(22) Filed: Aug. 4, 2014

(65) Prior Publication Data
US 2015/0077435 A1    Mar. 19, 2015

(30) Foreign Application Priority Data
Sep. 13, 2013    (JP) .................................. 2013-190309

(51) Int. Cl.
*G06T 19/00* (2011.01)
*G06F 3/01* (2006.01)

(52) U.S. Cl.
CPC ............ *G06T 19/006* (2013.01); *G06F 3/017* (2013.01)

(58) Field of Classification Search
CPC .............................. G06T 19/006; G06T 7/204
See application file for complete search history.

(56) References Cited

U.S. PATENT DOCUMENTS

| | | | |
|---|---|---|---|
| 5,252,951 A | * | 10/1993 | Tannenbaum .......... G06F 3/023 345/156 |
| 6,154,723 A | * | 11/2000 | Cox ........................ G06F 3/011 345/419 |
| 7,877,224 B2 | | 1/2011 | Ohta |
| 7,881,560 B2 | | 2/2011 | John |
| 8,451,266 B2 | | 5/2013 | Hertenstein |
| 8,624,725 B1 | * | 1/2014 | MacGregor ........... H04W 4/026 340/539.13 |
| 2002/0089544 A1 | * | 7/2002 | Jahn ........................ G06F 3/011 715/778 |

(Continued)

FOREIGN PATENT DOCUMENTS

| | | |
|---|---|---|
| JP | 2000-163558 | 6/2000 |
| JP | 2003-141569 A | 5/2003 |

(Continued)

OTHER PUBLICATIONS

Australian Office Action dated May 8, 2015 in Patent Application No. 2014210571.

(Continued)

*Primary Examiner* — Jitesh Patel
(74) *Attorney, Agent, or Firm* — Oblon, McClelland, Maier & Neustadt, L.L.P.

(57) ABSTRACT

A setting method executed by a computer includes acquiring display data to be associated with a reference object detected from a first input image data and to be displayed when the reference object is detected from another input image, generating, by the computer, attitude information indicating an arrangement attitude of the display data relative to the reference object, based on rotation information indicating a magnitude of rotation that is applied to the computer by a user, and storing, in a storage device, setting information including the attitude information, the display data, and identification information of the reference object.

18 Claims, 24 Drawing Sheets

(56) References Cited

U.S. PATENT DOCUMENTS

| | | | |
|---|---|---|---|
| 2003/0193505 A1* | 10/2003 | Ribadeau Dumas | G06F 3/04815 345/473 |
| 2004/0046779 A1* | 3/2004 | Asano | G06K 9/00664 715/716 |
| 2004/0104935 A1* | 6/2004 | Williamson | G06F 3/012 715/757 |
| 2004/0183926 A1 | 9/2004 | Fukuda et al. | |
| 2005/0063610 A1* | 3/2005 | Wu | G06T 7/0026 382/294 |
| 2006/0125691 A1* | 6/2006 | Menache | A63F 13/06 342/450 |
| 2006/0269100 A1* | 11/2006 | Saito | G06K 7/0004 382/100 |
| 2007/0043811 A1* | 2/2007 | Kim | G06Q 10/06 709/203 |
| 2007/0081695 A1* | 4/2007 | Foxlin | G06T 7/0042 382/103 |
| 2007/0118739 A1 | 5/2007 | Togashi et al. | |
| 2007/0120843 A1* | 5/2007 | Park | G03B 35/00 345/419 |
| 2007/0242886 A1* | 10/2007 | St John | G06K 9/3216 382/201 |
| 2008/0074391 A1* | 3/2008 | Coe | G06F 3/017 345/163 |
| 2008/0075358 A1* | 3/2008 | Yu | G06T 7/0018 382/154 |
| 2008/0310686 A1 | 12/2008 | Kretz | |
| 2009/0063047 A1* | 3/2009 | Ono | G01C 21/20 701/431 |
| 2009/0080874 A1 | 3/2009 | Ikehata et al. | |
| 2009/0102859 A1* | 4/2009 | Athsani | G06F 3/011 345/619 |
| 2009/0265671 A1* | 10/2009 | Sachs | G06F 3/017 715/863 |
| 2009/0293012 A1* | 11/2009 | Alter | G01C 21/20 715/810 |
| 2010/0328201 A1* | 12/2010 | Marvit | G06F 1/1613 345/156 |
| 2011/0058187 A1* | 3/2011 | Smith | G06Q 10/06 358/1.9 |
| 2011/0115816 A1* | 5/2011 | Brackney | G06Q 10/06 345/629 |
| 2011/0134108 A1* | 6/2011 | Hertenstein | G06T 19/006 345/419 |
| 2011/0159957 A1 | 6/2011 | Kawaguchi et al. | |
| 2011/0279697 A1* | 11/2011 | Shingu | H04N 5/2621 348/222.1 |
| 2012/0075343 A1* | 3/2012 | Chen | G09G 5/397 345/633 |
| 2012/0087580 A1* | 4/2012 | Woo | G06T 19/006 382/165 |
| 2012/0088526 A1* | 4/2012 | Lindner | H04M 1/72522 455/457 |
| 2012/0127201 A1* | 5/2012 | Kim | G09G 5/377 345/633 |
| 2012/0176516 A1 | 7/2012 | Elmekies | |
| 2012/0210255 A1 | 8/2012 | Ooi et al. | |
| 2012/0218257 A1 | 8/2012 | Hisano | |
| 2012/0218300 A1 | 8/2012 | Hayakawa | |
| 2012/0296564 A1* | 11/2012 | Ma | G01C 21/3679 701/436 |
| 2012/0307003 A1* | 12/2012 | Huang | H04N 5/2251 348/37 |
| 2012/0327119 A1* | 12/2012 | Woo | G06F 3/147 345/633 |
| 2013/0027570 A1 | 1/2013 | Kinoshita | |
| 2013/0141461 A1* | 6/2013 | Salter | G06T 7/0044 345/633 |
| 2013/0158928 A1* | 6/2013 | Hogdal | G01C 21/20 702/104 |
| 2013/0208005 A1* | 8/2013 | Kasahara | G06T 19/006 345/633 |
| 2013/0293686 A1* | 11/2013 | Blow | G06T 7/0065 348/50 |
| 2013/0307875 A1* | 11/2013 | Anderson | G06T 19/006 345/633 |
| 2014/0300732 A1* | 10/2014 | Friend | G06T 7/0042 348/135 |

FOREIGN PATENT DOCUMENTS

| | | |
|---|---|---|
| JP | 2004-287699 | 10/2004 |
| JP | 2005-100134 | 4/2005 |
| JP | 2005-251118 | 9/2005 |
| JP | 2006-285475 | 10/2006 |
| JP | 2010-531089 | 9/2010 |
| JP | 2011-521318 | 7/2011 |
| JP | 2011-239996 | 12/2011 |
| JP | 2012-168798 | 9/2012 |
| JP | 2012-174243 | 9/2012 |
| JP | 2012-178064 | 9/2012 |
| JP | 2012-212345 | 11/2012 |
| KR | 10-2011-0004940 A | 1/2011 |
| WO | WO 2005/119539 A1 | 12/2005 |
| WO | WO 2009/127701 A1 | 10/2009 |
| WO | WO 2010/001756 A1 | 1/2010 |

OTHER PUBLICATIONS

Extended European Search Report dated Nov. 25, 2015 in Patent Application No. 14180496.3.
Office Action dated Oct. 21, 2015 in Australian Patent Application No. 2014210571.
Office Action of Chinese Patent Application No. 201410424661.7 dated Nov. 30, 2016 with full translation.
Japanese Office Action dated Jul. 11, 2017, issued in Japanese Patent Application No. 2013-190309 (with machine generated English translation), 8 pages.
Office Action dated Oct. 3, 2017 in Japanese Patent Application No. 2013-190309 (with unedited computer generated English translation).
Combined Chinese Office Action and Search Report dated Mar. 5, 2018 in Chinese Patent Application No. 201410424661.7 (with English translation).

* cited by examiner

FIG. 3

$$M = \begin{bmatrix} r11 & r12 & r13 & X1c \\ r21 & r22 & r23 & Y1c \\ r31 & r32 & r33 & Z1c \\ 0 & 0 & 0 & 1 \end{bmatrix}$$

$$R = \begin{bmatrix} r11 & r12 & r13 \\ r21 & r22 & r23 \\ r31 & r32 & r33 \end{bmatrix}$$

FIG. 4

$$R1 = \begin{bmatrix} 1 & 0 & 0 \\ 0 & \cos P1c & -\sin P1c \\ 0 & \sin P1c & \cos P1c \end{bmatrix}$$

$$R2 = \begin{bmatrix} \cos Q1c & 0 & \sin Q1c \\ 0 & 1 & 0 \\ -\sin Q1c & 0 & \cos Q1c \end{bmatrix}$$

$$R3 = \begin{bmatrix} \cos R1c & -\sin R1c & 0 \\ \sin R1c & \cos R1c & 0 \\ 0 & 0 & 1 \end{bmatrix}$$

FIG. 11

| MARKER ID | Xc | Yc | Zc | Pc | Qc | Rc | CONTENT ADDITION FLAG |
|---|---|---|---|---|---|---|---|
| M1 | X1c | Y1c | Z1c | P1c | Q1c | R1c | 1 |
| ... | ... | ... | ... | ... | ... | ... | ... |
|  |  |  |  |  |  |  |  |

FIG. 12

| TEMPLATE ID | | T1 | |
|---|---|---|---|
| VERTEX COORDINATES | 0 | (0, 0, 0) | ⎫ |
| | 1 | (X3m, Y3m, Z3m) | |
| | 2 | (X4m, Y4m, Z4m) | |
| | 3 | (X5m, Y5m, Z5m) | T21 |
| | 4 | (X6m, Y6m, Z6m) | |
| | 5 | ... | |
| | 6 | ... | |
| | 7 | ... | |
| | ... | ... | ⎭ |
| 1 | ORDER OF VERTICES | 1, 3, 4, 5, 7 | ⎫ |
| | TEXTURE ID | 21 | |
| 2 | ORDER OF VERTICES | 2, 3, 4, 5, 6 | T22 |
| | TEXTURE ID | 21 | |
| ... | ORDER OF VERTICES | ... | |
| | TEXTURE ID | ... | ⎭ |

FIG. 13

| CONTENT ID | Xm | Ym | Zm | Pm | Qm | Rm | Jx | Jy | Jz | TEMPLATE ID | MARKER ID | ADDITIONAL INFORMATION |
|---|---|---|---|---|---|---|---|---|---|---|---|---|
| C1 | Xm1 | Ym1 | Zm1 | Pm1 | Qm1 | Rm1 | Jx1 | Jy1 | Jz1 | T1 | M1 | "CHECK TO SEE THAT VALVE IS CLOSED" |
| C2 | Xm2 | Ym2 | Zm2 | Pm2 | Qm2 | Rm2 | Jx2 | Jy2 | Jz2 | T3 | M1 | |
| | | | | | | | | | | | | |

SETTING METHOD AND INFORMATION PROCESSING DEVICE

CROSS-REFERENCE TO RELATED APPLICATION

This application is based upon and claims the benefit of priority from the prior Japanese Patent Application No. 2013-190309, filed on Sep. 13, 2013, the entire contents of which are incorporated herein by reference.

FIELD

The techniques disclosed in the embodiments are related to techniques for setting an arrangement attitude of display data that is displayed in such a manner as to be overlaid on a captured image.

BACKGROUND

Model data of a three-dimensional object arranged in a three-dimensional virtual space corresponding to a real space is displayed in such a manner that the model data is overlaid on a captured image taken by an imaging device. This technology expands information collected through human perception, such as visual perception, and thus is called augmented reality (AR) technology, for example. The model data of a three-dimensional object arranged in a three-dimensional virtual space corresponding to the real space is called AR content. Note that model data of a three-dimensional object is also called an object.

AR content is information in which it is defined in advance what kind of object is to be arranged in what attitude at what position in a virtual space. Accordingly, with AR technology, a projection image of an object may be generated based on arrangement defined in advance, and the projection image may be displayed in such a manner as to be overlaid on a captured image. Note that a projection image of an AR object is generated based on the positional relationship between an imaging device and AR content.

In order to determine the positional relationship between an imaging device and an AR content, a reference object is used. For example, it is typical to use an AR marker as a reference object. That is, when an AR marker is detected from a captured image taken by an imaging device, the positional relationship between the AR marker and the imaging device is determined based on a figure of the AR marker that appears in the captured image of the imaging device. Then, reflecting the positional relationship, a projection image of the object of AR content associated with the AR marker is generated, and that projection image is displayed in such a manner as to be overlaid on the captured image (for example, Japanese National Publication of International Patent Application No. 2010-531089 and International Publication Pamphlet No. WO 2005-119539).

In order to display the AR content in such a manner as to be overlaid, operations of creating AR content (also referred to as authoring) are performed in advance. Note that the operations of creating AR content are operations that generate an object and set arrangement of that object in a three-dimensional space. Note that arrangement is designated in terms of a relative position and an attitude when measured with respect to a reference object. That is, in authoring operations, the position of an AR object in a virtual space with respect to a reference object is set as an arrangement position. Additionally, the inclination of the AR object in the virtual space with respect to the reference object is set as an arrangement attitude.

Here, there is an information processing device that arranges a virtual object at a three-dimensional position corresponding to a designated position designated by the user on a plane including a face, which is a face of an object model in the real space reflected in an input image and is designated by the user (for example, Japanese Laid-open Patent Publication No. 2012-168798). That is, the information processing device may arrange a virtual object on the plane of the object model existing in the real space in accordance with the user's instruction for the designated position.

Additionally, there is a technique in which when data being displayed on a monitor is displayed in such a manner that the other image data is superimposed on the data being displayed, a relative motion of an image of a subject for photography captured by a digital camera is reflected in the other image data (for example, Japanese Laid-open Patent Publication No. 2006-285475). The display position of the other image data is adjusted in three dimensional directions, right and left and backwards and forwards, by increasing or decreasing the distance of the digital camera to the subject for photography.

SUMMARY

According to an aspect of the invention, a setting method executed by a computer includes acquiring display data to be associated with a reference object detected from a first input image data and to be displayed when the reference object is detected from another input image, generating, by the computer, attitude information indicating an arrangement attitude of the display data relative to the reference object, based on rotation information indicating a magnitude of rotation that is applied to the computer by a user, and storing, in a storage device, setting information including the attitude information, the display data, and identification information of the reference object.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 depicts a transformation matrix M from the marker coordinate system to the camera coordinate system, and a rotation matrix R in the transformation matrix M;

FIG. 4 depicts rotation matrices R1, R2, and R3;

FIG. 11 illustrates a marker management table;

FIG. 12 illustrates a template information table;

FIG. 13 illustrates a setting information table;

DESCRIPTION OF EMBODIMENTS

Figure 1:
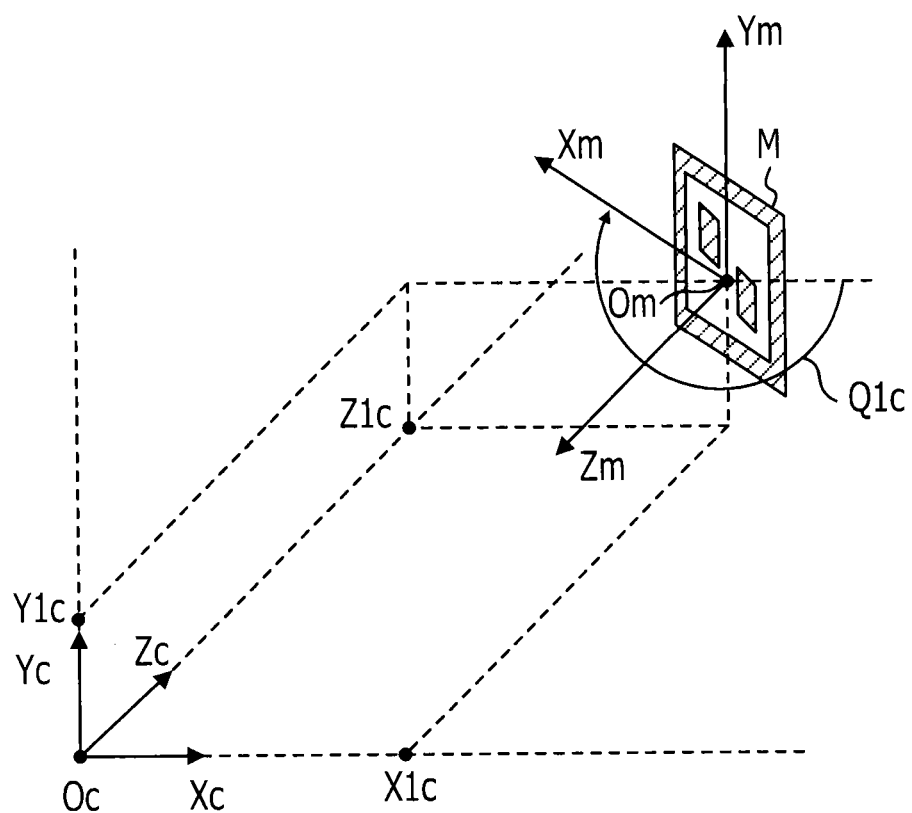
FIG. 1 illustrates the relationship between a camera coordinate system and a marker coordinate system.

According to the techniques disclosed in Patent Literature 3 and Patent Literature 4, a display position of image data displayed in such a manner as to be overlaid may be adjusted or set. However, in authoring of AR content, not only the arrangement position but also the arrangement attitude has to be controlled. With these techniques, it has been impossible to set the arrangement attitude, for example.

Additionally, in another conventional authoring approach, specifically, the authoring operator manually inputs the value of rotation for changing the attitude, and thereby it has been possible to control the attitude. However, with this scheme, since the authoring operator has to input a specific value of rotation, the load on the user has been high.

Accordingly, an object of the techniques disclosed in the embodiments is to easily set the attitude of an AR object in operations of creating AR content for setting the arrangement position and arrangement attitude of the AR object.

Hereinafter, detailed embodiments of the present disclosure will be described. It is to be noted that embodiments described below may be combined appropriately as long as no contradictions arise among the contents of processing. Each embodiment will be described hereinafter with reference to the drawings.

To begin with, AR technology will be described in which an AR object arranged in a three-dimensional virtual space corresponding to a real space is displayed in such a manner that the AR object is overlaid on a captured image taken by a camera. The AR object is model data of a three-dimensional object arranged in the virtual space. Additionally, AR content is information that defines what kind of AR object is arranged in what manner in the virtual space. Note that authoring described below is operations of creating AR content and operations of setting the arrangement position and the arrangement attitude in a virtual space relative to an AR object.

The AR object is, for example, model data including a plurality of points. A pattern (texture) is set for each of a plurality of faces acquired by interpolating a plurality of points with straight lines and curves, and a three-dimensional model is formed by combining the plurality of faces. The AR object is arranged in a virtual space by defining coordinates of all the points constituting the AR object with respect to a reference object existing in the real space. The object does not exist at a position of the coordinates of all the points in the real space, and the coordinates of all the points are defined in the virtual space with respect to the reference object.

While the AR object is arranged in a virtual space, the relationship in terms of position between a camera and a reference object in the real space is determined based on a visual appearance (figure) of the reference object that appears in a captured image taken by the camera. Using the coordinates in the virtual space with respect to the reference object existing in the real space as well as the relationship in terms of position between the camera and the reference object in the real space, the relationship in terms of position between the camera and the coordinates of all the points of the AR object in a three-dimensional virtual space corresponding to the real space is determined.

Based on these relationships in terms of position, the figure of the AR object obtained when the camera captures the reference object is determined. Then, the figure of the AR object overlaid on the captured image is displayed. Operations for calculating the figure of the AR object will be further described with reference to FIG. 1, FIG. 2, FIG. 3, and FIG. 4.

FIG. 1 illustrates the relationship between a camera coordinate system and a marker coordinate system. A marker M illustrated in FIG. 1 is an exemplary reference object. The marker M illustrated in FIG. 1 is square-shaped, and its size is determined in advance (for example, the length of one side is 5 cm). Note that although the marker M illustrated in FIG. 1 is square-shaped, another object having a shape with which the relative position from a camera and the orientation are distinguishable even based on a figure obtained by image capturing from any viewpoint among a plurality of viewpoints may be used for a reference object. For example, a feature point generated from a captured image, or the like, may be used as a reference object.

The camera coordinate system includes three dimensions of (Xc, Yc, Zc), and uses, for example, the focus of a camera as the origin (origin Oc). For example, an Xc-Yc plane of the camera coordinate system is a face parallel to the face of an imaging device of the camera, and a Zc axis is an axis perpendicular to the face of the imaging device.

The marker coordinate system includes three dimensions of (Xm, Ym, Zm), and, for example, uses the center of the marker M as the origin (origin Om). For example, an Xm-Ym plane of the marker coordinate system is a face parallel to the marker M, and a Zm axis is perpendicular to the face of the marker M. The origin Om is represented by coordinates V1c (X1c, Y1c, Z1c) in the camera coordinate system.

Additionally, the angle of rotation of the marker coordinate system (Xm, Ym, Zm) relative to the camera coordinate system (Xc, Yc, Zc) is represented by rotational coordinates G1c (P1c, Q1c, R1c). P1c is the angle of rotation about the Xc axis, Q1c is the angle of rotation about the Yc axis, and R1c is the angle of rotation about the Zc axis. The marker coordinate system exemplified in FIG. 1 rotates only about the Ym axis, and therefore P1c and R1c are zero. Note that each angle of rotation is calculated based on what figure, in a captured image to be processed, the reference object having a known shape is captured as.

Figure 2:
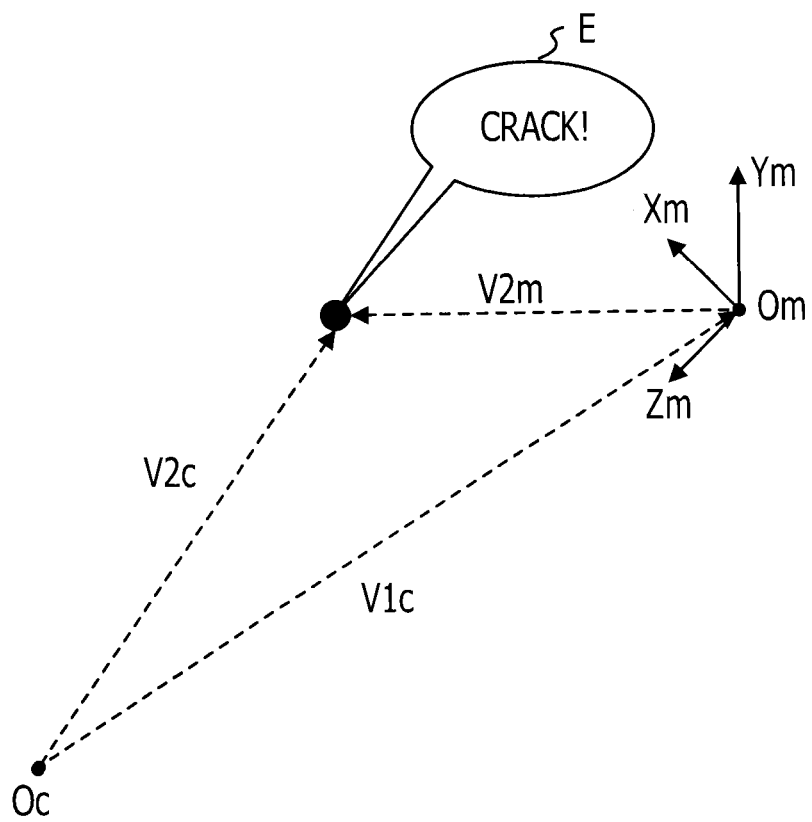
FIG. 2 illustrates an example of an AR object E in the camera coordinate system and the marker coordinate system.

FIG. 2 illustrates an example of an AR object E in the camera coordinate system and the marker coordinate system. The AR object E illustrated in FIG. 2 is an object having a balloon shape, and contains text data "Crack!" in a balloon. A black circle at the tip of the balloon of the AR object E indicates a reference point for the AR object E. The coordinates in the marker coordinate system of the reference point are assumed to be V2m (X2m, Y2m, Z2m).

Furthermore, the orientation of the AR object E is defined by rotational coordinates G2m (P2m, Q2m, R2m), and the size of the AR object E is defined by magnification factors D (Jx, Jy, Jz). Note that the rotational coordinates G2m of the AR object E represent how much the AR object is rotated relative to the marker coordinate system when it is arranged. For example, when G2m is (0, 0, 0), AR display of the AR object parallel to the marker will be given.

The coordinates of each point constituting the AR object E are coordinates obtained by adjusting the coordinates of each point defined in definition data (AR template), which is a model for the AR object E, based on the coordinates V2m of the reference point, the rotational coordinates G2m, and the magnification factors D. Note that, in the AR template, the coordinates of each point are defined on the assumption that the coordinates of the reference point are (0, 0, 0).

Thereafter, upon setting of the reference point V2m of the AR object employing the AR template, the coordinates of each point constituting the AR template are translated based on the coordinates V2m. Additionally, each of coordinates included in the AR template is rotated based on the set rotational coordinates G2m, and is expanded and contracted by the magnification factors D. That is, the AR object E of FIG. 2 indicates a state where the AR object E is constructed based on points obtained by adjusting each of the points defined in the AR template based on the coordinates V2m of the reference point, the rotational coordinates G2m, and the magnification factors D.

Note that the AR object E may be generated by generating an AR object E that is a set of points adjusted based on the coordinates V2m of the reference point and the magnification factors D and rotating each axis of the AR object E' in accordance with the rotational coordinates G2m.

The coordinates of each point of the AR object E, which are coordinates in the marker coordinate system that have been set, are transformed to those in the camera coordinate system, and further the position in a screen is calculated based on the coordinates of the camera coordinate system, so that a figure for displaying the AR object E in such a manner as to be overlaid is generated.

The coordinates in the camera coordinate system of each point included in the AR object E are calculated by coordinate transformation (model-view transformation) of the coordinates in the marker coordinate system of that point based on the coordinates V1c in the camera coordinate system of the origin Om of the marker and the rotational coordinates G1c in the marker coordinate system relative to the camera coordinate system. For example, a model-view transformation is performed on the reference point V2m of the AR object E, thereby determining which point V2c (X2c, Y2c, Z2c) in the camera coordinate system the reference point defined in the marker coordinate system corresponds to.

FIG. 3 depicts a transformation matrix M from the marker coordinate system to the camera coordinate system, and a rotation matrix R in the transformation matrix M. The transformation matrix M is a 4×4 matrix. From the product of the transformation matrix M and the column vector (Xm, Ym, Zm, 1) for the coordinates Vm in the marker coordinate system, a column vector (Xc, Yc, Zc, 1) for the corresponding coordinates Vc in the camera coordinate system is obtained.

That is, point coordinates in the marker coordinate system to be coordinate transformed (model-view transformation) are substituted for the column vector (Xm, Ym, Zm, 1) and then a matrix operation is performed, so that the column vector (Xc, Yc, Zc, 1) including the point coordinates in the camera coordinate system is obtained.

A submatrix (rotation matrix R) with first to third rows and first to third columns of the transformation matrix M acts on the coordinates in the marker coordinate system, so that a rotation operation for causing the orientation of the marker coordinate system to coincide with the orientation of the camera coordinate system is performed. A submatrix with the first to third rows and a fourth column of the transformation matrix M acts, so that a translation operation for causing the position of the marker coordinate system to coincide with the position of the camera coordinate system is performed.

FIG. 4 depicts rotation matrices R1, R2, and R3. Note that the rotation matrix R depicted in FIG. 3 is calculated by the product (R1·R2·R3) of the rotation matrices R1, R2, and R3. Additionally, the rotation matrix R1 represents the rotation of an Xm axis relative to the Xc axis. The rotation matrix R2 represents the rotation of the Ym axis relative to the Yc axis. The rotation matrix R3 represents the rotation of the Zm axis relative to the Zc axis.

The rotation matrices R1, R2, and R3 are generated based on the figure of a reference object in a captured image. That is, the angles of rotation P1c, Q1c, and R1c are calculated based on what figure, in a captured image to be processed, the reference object having a known shape is captured as, as described earlier. Based on the calculated angles of rotation P1c, Q1c, and R1c, the rotation matrices R1, R2, and R3 are generated, respectively.

The coordinates (Xm, Ym, Zm) in the marker coordinate system of each point constituting the AR object E are transformed into the coordinates (Xc, Yc, Zc) in the camera coordinate system by the model-view transformation based on the transformation matrix M. For example, the coordinates V2m are transformed into coordinates V2c by the model-view transformation. The coordinates (Xc, Yc, Zc) obtained by the model-view transformation represent relative positions from a camera if the camera were to exist in a virtual space where the AR object E exists.

Then, the coordinates in the camera coordinate system of each point of the AR object E are transformed into those in a screen coordinate system. The screen coordinate system has two dimensions (Xs, Ys). The screen coordinate system (Xs, Ys) has, for example, the center of a captured image obtained by image-capturing processing of a camera as the origin (origin Os). Based on the coordinates in the screen coordinate system of each point obtained by this coordinate transformation (perspective transformation), a figure for displaying the AR object E in such a manner as to be overlaid on a captured image is generated.

Coordinate transformation (perspective transformation) from the camera coordinate system to the screen coordinate system is performed, for example, based on a focal distance f of the camera. The Xs coordinate of the coordinates in the screen coordinate system corresponding to the coordinates (Xc, Yc, Zc) in the camera coordinate system is determined by Formula 1 given below. The Ys coordinate of the coordinates in the screen coordinate system corresponding to the coordinates (Xc, Yc, Zc) in the camera coordinate system is determined by Formula 1 and Formula 2 given below.

$$Xs = f \cdot Xc/Zc \quad \text{(Formula 1)}$$

$$Ys = f \cdot Yc/Zc \quad \text{(Formula 2)}$$

The figure of the AR object E is generated based on the coordinates (screen coordinate system) obtained by perspective-transforming the coordinates (camera coordinate system) of each point constituting the AR object E. The AR object E is generated by mapping textures onto faces acquired by interpolating a plurality of points constituting the AR object E. In the AR template from which the AR object E originates, it is defined which point is to be interpolated to form a face and which texture is to be mapped to which face.

Through the model-view transformation and perspective transformation described above, the coordinates on the captured image corresponding to the coordinates in the marker coordinate system are calculated, and the figure of the AR object E in accordance with the viewpoint of the camera is generated by utilizing the calculated coordinates. Note that the generated image of the AR object E is called a projection image of the AR object E. The projection image of the AR object E is combined into the captured image, so that visual information offered to the user is augmented.

Additionally, in another manner, a projection image of the AR object E is displayed on a transmissive display. Also in this manner, a figure in the real space that the user obtains through the display coincides with the projection image of the AR object, and thus visual information offered to the user is augmented.

In the embodiments, position coordinates and rotational coordinates of the AR object E to which the AR technology described above is to be applied are set by the information processing device 1 having a camera function and a display function. The information processing device 1 sets the position coordinates and the rotational coordinates of the AR object E in accordance with input from the user. Particularly, in the embodiments, the information processing device 1 sets the attitude corresponding to the rotational coordinates of the AR object.

Figure 5:
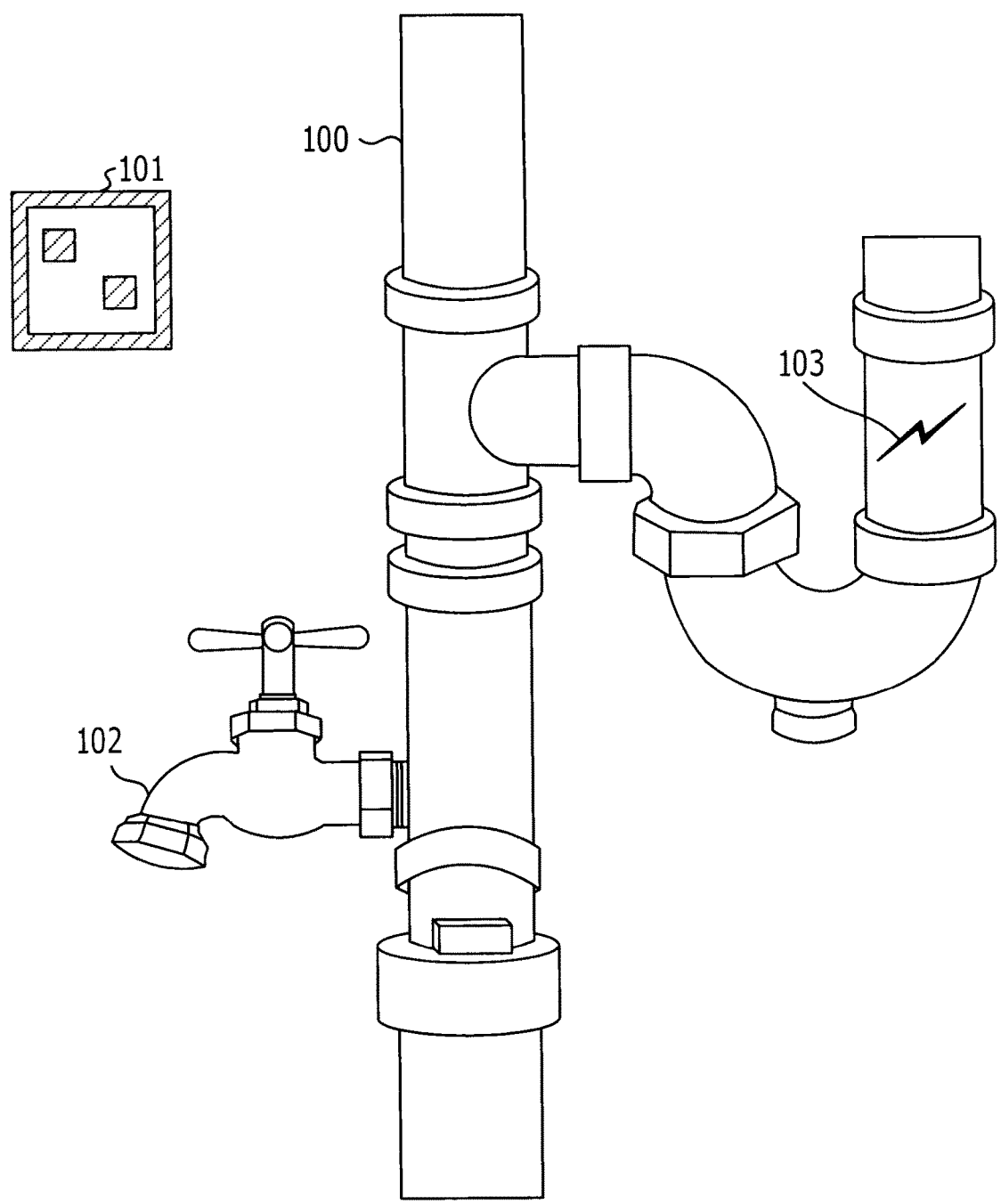
FIG. 5 illustrates an example of arrangement of an object in a real space.

FIG. 5 illustrates an example of arrangement of an object in the real space. As illustrated in FIG. 5, in the real space, a piping 100 having a valve 102, and a marker 101 are arranged. Note that, in the embodiments, the marker 101 is a printed matter in which an image with identification information of each marker embedded therein is printed. The marker 101 is also stuck on the wall or the like. Additionally, the piping 100 has a crack 103.

For the real space in such a manner, it is conceivable that an operator who performs authoring may create AR content indicating content of an operation to "Check to see that valve is closed" for the valve 102, and AR content indicating the direction of rotation of the valve 102. It is also conceivable that the operator may create AR content indicating a message to a subsequent inspector "Crack!" for the crack 103.

Note that, after creation of AR content, an inspection operator captures an image containing the marker 101, so that AR content corresponding to the marker 101 displayed in such a manner as to be overlaid on the captured image is offered to the inspection operator. The inspection operator can perform an inspection operation while referring to information indicated by the AR content.

Here, a method for setting creation and arrangement of AR content in creation (authoring operations) of the AR content is described. For example, an operator selects an AR object and sets the arrangement position and attitude of the AR object.

For example, an AR object is generated in such a way that the user selects a desired template from AR templates created in advance. Regarding the position designation, it is, for example, conceivable that the user designates a position in a displayed, captured image. That is, the user who performs position designation designates a position at which the user wishes to display a projection image of the AR object E on a touch panel on which the captured image is displayed. In addition, for the position in the depth direction, inputting a numerical value or designating a position in a bird's-eye view image may be performed. In the embodiments, a conventional method is applicable to designation of a position of AR content.

Figure 6:
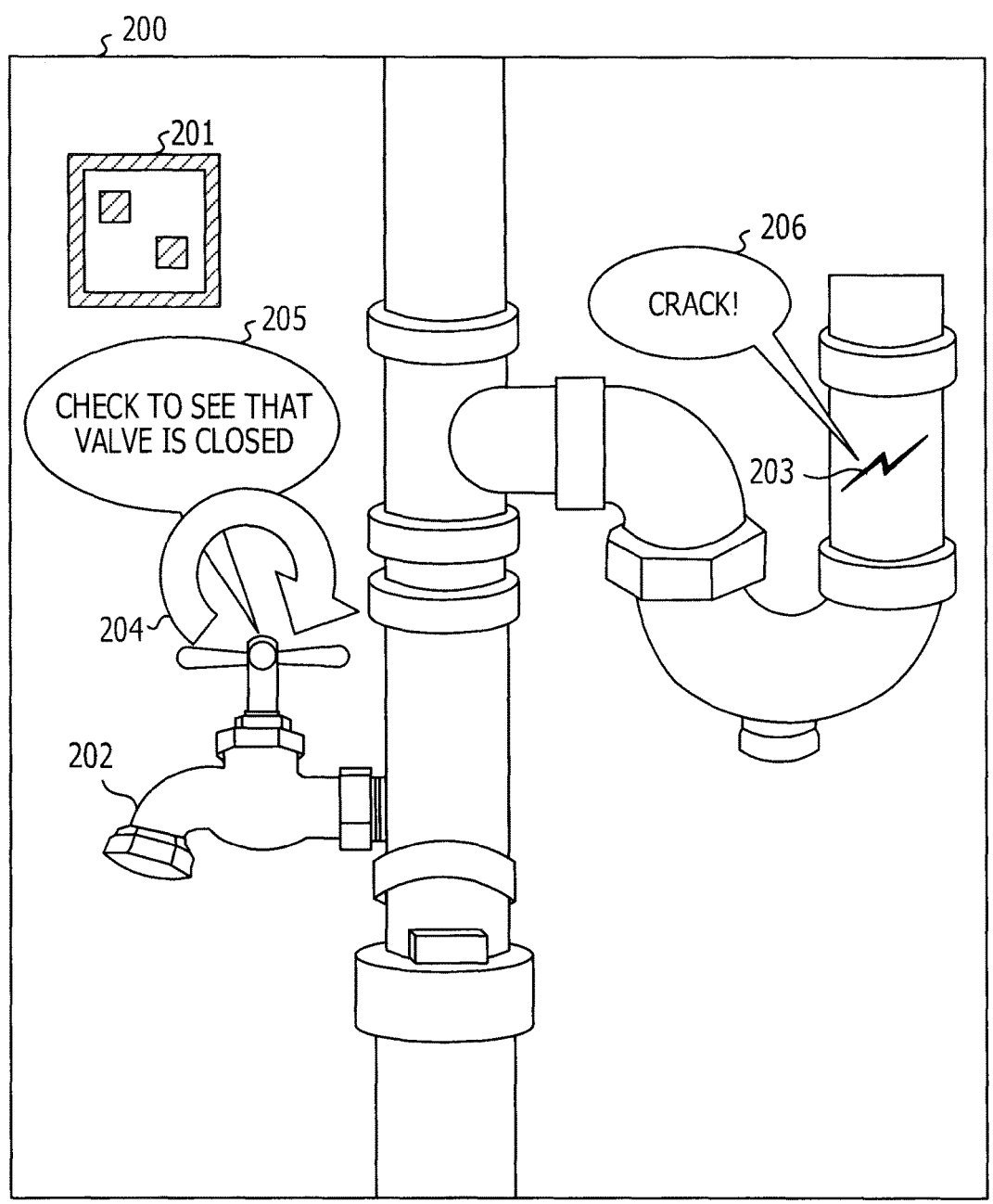
FIG. 6 illustrates an example of a combined image when setting of the attitude of AR content is inappropriate.

Next, FIG. 6 illustrates an example of a combined image when setting of the attitude of AR content is inappropriate. Note that the combined image is an image in which a projection image of AR content is displayed in such a manner as to be overlaid on a captured image corresponding to the real space. Figures of the marker 201, the valve 202, the crack 203, and so on appear in the combined image 200. Additionally, projection images of the AR content 204, the AR content 205, and the AR content 206 are displayed.

Here, the AR content 205 and the AR content 206 are displayed at respective suitable positions. For example, the AR content 206 "Crack!" is displayed so as to indicate the position of the crack 203. Since the balloon portion is displayed so as to indicate the crack 203 that exists in the lower right of the AR content 206, it may be said that the attitude is also suitable.

In contrast, although since the AR content 204 is arranged near the valve 202, the arrangement position may be said to be suitable, the arrangement attitude is unsuitable. For example, it is assumed that the valve 202 closes when the handle is rotated clockwise on the plane perpendicular to the drawing of FIG. 6 and open when the handle is rotated anticlockwise.

If an operator has to check to see that the valve closes, it is preferable that the AR content 204 be arranged in such a manner that the operator can recognize clockwise rotation of the handle on the plane perpendicular to the drawing of FIG. 6. However, the arrow represented by the AR content 204 in FIG. 6 seems to indicate that the handle is rotated clockwise on a plane parallel to the drawing of FIG. 6. That is, in FIG. 6, the direction of rotation of the handle of the valve existing in the real space and the direction of rotation indicated by the AR content 204 do not coincide with each other.

That is, the display in the state of the combined image 200 reveals that the attitude of the AR content has been unsuitably set in authoring. In this case, there is a possibility that an inspection operator who refers to the AR content displayed with the unsuitable attitude would perform a wrong operation.

Figure 7:
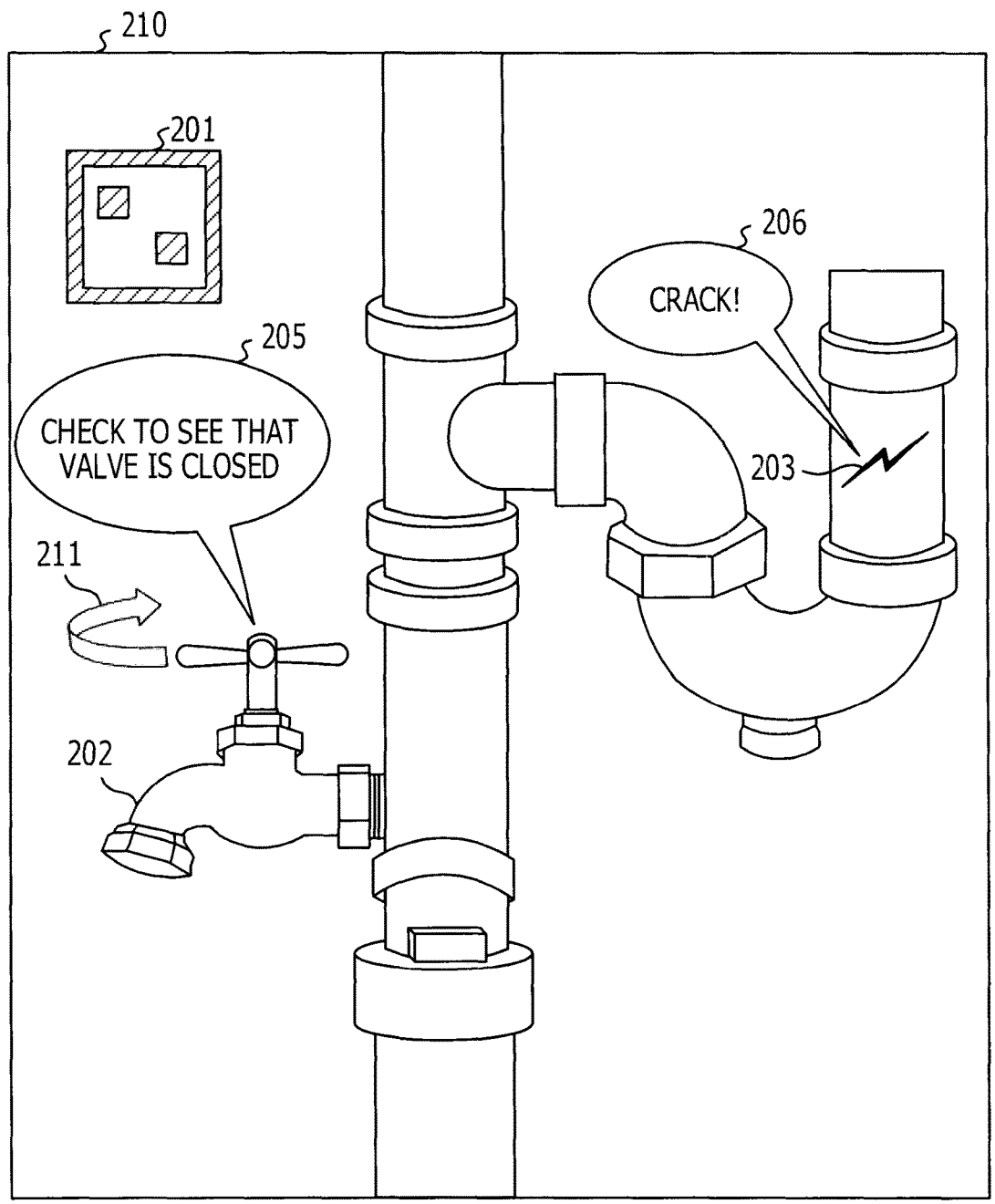
FIG. 7 illustrates an example of a combined image when setting of the attitude of AR content is appropriate.

FIG. 7 illustrates an example of a combined image when setting of the attitude of AR content is appropriate. In the combined image 210, as in FIG. 6, figures of the marker 201, the valve 202, the crack 203, and so on and projection images of the AR content 205 and the AR contents 206 are drawn. Here, the combined image 210 of FIG. 7 contains the AR content 211 instead of the AR content 204 in FIG. 6.

The AR content 211 indicates the direction of rotation of the valve appropriately. That is, an inspection operator who has viewed the combined image 210 can understand that it is possible to "Check to see that valve is closed" by rotating the handle clockwise on the plane perpendicular to the drawing of FIG. 7.

In each embodiment described in more detail below, when an operator sets the attitude of arrangement of an AR object, the operator rotates an information processing device possessed by the operator in a direction in which the operator wishes to rotate the AR object. Then, the information processing device acquires information on rotation of itself, and reflects the information in attitude information related to arrangement of the AR object. Accordingly, the operator may create AR content sensuously.

First Embodiment

Figure 8:
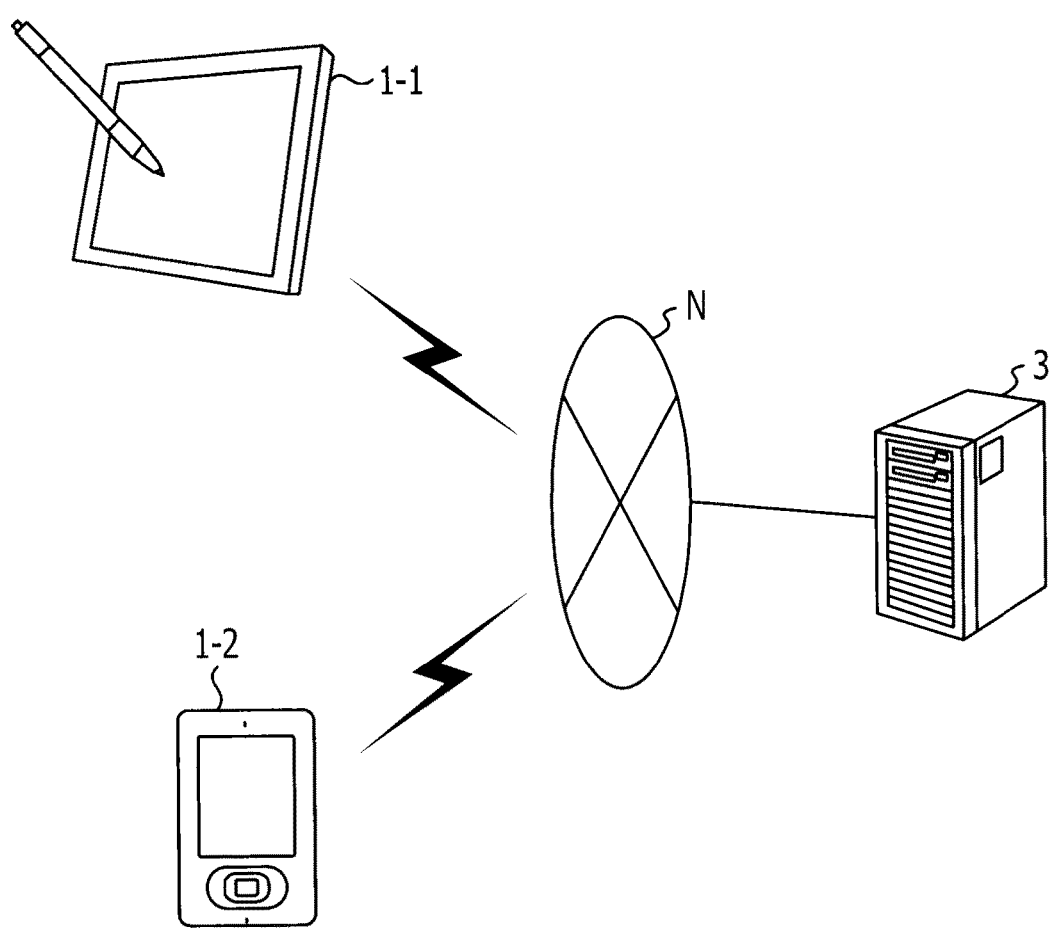
FIG. 8 is a system configuration illustration.

First, detailed processing according to a first embodiment and configurations of an information processing device and so on will be described. FIG. 8 is a system configuration illustration. In the example of FIG. 8, a communication terminal 1-1 and a communication terminal 1-2 are illustrated as examples of an information processing device. Hereinafter, these are collectively referred to as the information processing device 1. Additionally, the information processing device 1 communicates over a network N with a management device 3.

The information processing device 1 is, for example, a computer, such as a tablet personal computer (PC) or a smartphone, having an imaging device. The management device 3 is, for example, a server computer and manages the information processing device 1. The network N is the Internet, for example. Note that a system according to this embodiment includes the information processing device 1 and the management device 3.

The information processing device 1 creates AR content. The information processing device 1 generates attitude information indicating an arrangement attitude of display data arranged in a virtual space, based on rotation information on rotation of the information processing device 1, and generates setting information associating attitude information, display data, and identification information of a reference object serves as a reference in a virtual space. Note that exemplary attitude information is the rotational coordinates described above. That is, an information processing device reflects rotation information on a rotation action of that information processing device in accordance with a rotation operation performed by the operator, in the rotational coordinates related to the arrangement attitude of an AR object.

The setting information includes attitude information indicating an arrangement attitude of AR content, display information on display data, and identification information that identifies a marker with which the AR content is associated. The setting information may further include position information indicating an arrangement position.

The attitude information is, for example, rotational coordinates Gm in the marker coordinate system. Additionally, display information is, for example, a template ID that identifies an AR template, or text information depicted in a template. Furthermore, the identification information is, for example, a marker ID that identifies a marker. Additionally, the position information is, for example, the position coordinates Vm of the reference point.

Here, an example of the rotation operation performed by an operator is given. As described in detail later, for example, an operation in which the operator rotates the information processing device 1 is included as an example. If the information processing device 1 is provided with a sensor that can detect an acceleration and an angular velocity, it is possible for that sensor to detect a rotation operation for the information processing device 1. Additionally, as in a second embodiment described later, it is also possible to detect a rotation operation from an image captured by an imaging device.

Furthermore, a rotation operation given to a terminal device is not limited to an operation of directly rotating a terminal device. For example, an operation in which the user instructs an AR object displayed on a touch panel type of display to rotate is also an example of the rotation operation. In this case, the information processing device 1 recognizes an operation input to a touch panel as a rotation operation. Additionally, if the information processing device 1 has a sound recognition function, a sound signal input by the user may be detected as a rotation operation. For example, when the user's utterance "rotate backwards by 40 degrees" is recognized, this is detected as a rotation operation (as a result, an inclination of 40 degrees is given in a z-axis direction).

In contrast, the management device 3 manages setting information for AR content created by the information processing device 1. For example, if creation of AR content is completed, the information processing device 1 sends setting information for the created AR content to the management device 3. Upon receipt of the setting information, the management device 3 stores the setting information in a storage unit of the management device 3.

Additionally, in the case where the information processing device 1 generates a combined image utilizing setting information, the information processing device 1 sends a request for setting information to the management device 3. The management device 3 sends setting information in response to the request received from the information processing device 1. Note that, as described later, in AR displaying, template information that defines templates of an AR object is also desired in addition to setting information. Accordingly, the management device 3 sends template information, together with setting information, to the information processing device 1. Note that details of template information will be described later.

Figure 9:
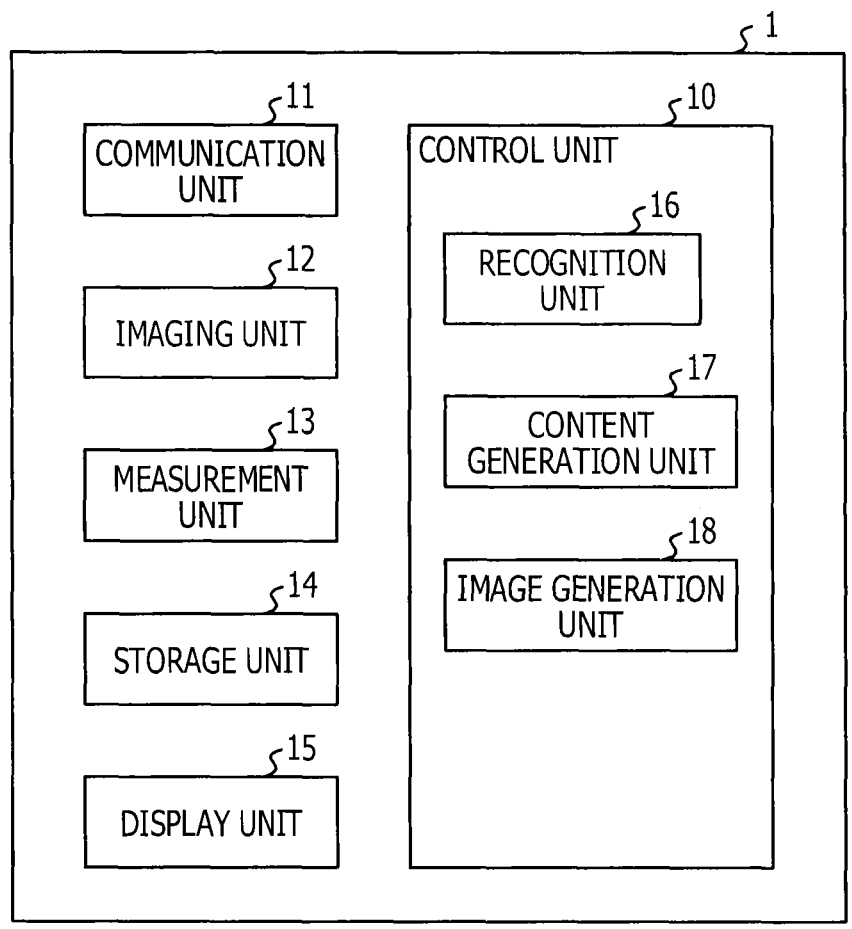
FIG. 9 is a functional block diagram of an information processing device according to a first embodiment.

Next, the functional configuration of the information processing device 1 will be described. FIG. 9 is a functional block diagram of the information processing device 1. The information processing device 1 includes a control unit 10, a communication unit 11, an imaging unit 12, a measurement unit 13, a storage unit 14, and a display unit 15. Additionally, if the information processing device 1 does not include the imaging unit 12, a captured image may be acquired from another imaging device by way of communication. In this case, a position at which an image is captured by another imaging device is utilized for creation of AR content.

The control unit 10 controls various kinds of processing of the entire information processing device 1. The control unit 10 also performs creation of AR content, generation of a combined image, and so on as described later. Note that the control unit 10 includes a recognition unit 16, a content generation unit 17, and an image generation unit 18.

The communication unit 11 communicates with other computers. For example, the communication unit 11 sends generated setting information to the management device 3. Additionally, in order to generate a combined image, setting information and template information are received from the management device 3.

The imaging unit 12 captures an image at an interval of a predetermined number of frames. Then, the imaging unit 12 inputs the captured image to the control unit 10. The measurement unit 13 measures rotation information for the information processing device 1. Then, the rotation information is input to the control unit 10.

The storage unit 14 stores various kinds of information under control of the control unit 10. The storage unit 14 stores setting information generated at the time of creation of AR content. Additionally, information such as marker management information is also temporarily stored. Note that the marker management information is information on a marker recognized from an input image. Details of this will be described later. Furthermore, if, in addition to the setting information generated at the time of creation of AR content, setting information generated in the past and template information are acquired from the management device 3, the storage unit 14 stores these pieces of information.

The display unit 15 displays a combined image generated by the image generation unit 18 and other images.

The recognition unit 16 recognizes a reference object from an input image. In this embodiment, the recognition unit 16 recognizes a marker. For example, the recognition unit 16 uses a template that predetermines the shape of a marker, and performs template matching, thereby recognizing the marker. Another known object recognition method may be applied as a method for recognizing the marker.

Furthermore, upon recognizing that the reference object is included in a captured image, the recognition unit 16 acquires identification information for identifying the reference object. For example, the marker ID is acquired. Note that the marker ID is identification information for identifying a marker. For example, in the case where the reference object is a marker, a unique marker ID is acquired from an arrangement of black and white, likewise in the case of a two-dimensional bar code. Another known acquisition method may be applied as a method for acquiring the marker ID.

Additionally, when recognizing the reference object, the recognition unit 16 calculates the position and rotational coordinates of the reference object based on the figure of the reference object. Note that the position and rotational coordinates of the reference object are the values in the camera coordinate system. Furthermore, the recognition unit 16 generates the transformation matrix M based on the position and rotational coordinates of the reference object.

The content generation unit 17 generates setting information. That is, the content generation unit 17 associates position information and attitude information, display data on an AR object, and identification information for a marker with one another, and generates setting information. For example, the content generation unit 17 calculates a corresponding three-dimensional position in the camera coordinate system from a point that is designated on a screen by the user. Then, the three-dimensional position (Xc, Yc, Zc) in the camera coordinate system is transformed into the marker coordinate system, based on a transformation matrix. The three-dimensional position (Xm, Ym, Zm) after the transformation is assumed to be position information indicating the arrangement position of the AR object.

Additionally, the content generation unit 17 acquires rotation information from the measurement unit 13. Then, the content generation unit 17 generates attitude information based on the rotation information. Here, in the first embodiment, the rotation information is acquired from the sensor with which the information processing device 1 is provided. Note that the sensor is an acceleration sensor, a gyroscope sensor, or the like. That is, the sensor is a device with which information on rotation and attitude of the information processing device 1 can be measured.

That is, in this embodiment, from the sensor, the content generation unit 17 acquires rotation information indicating an inclination of each of the three axis directions that are set with respect to the information processing device 1. Then, based on the acquired rotation information, the content generation unit 17 generates the rotational coordinates. Note that the rotational coordinates are exemplary attitude information.

For example, in the information processing device 1, a display (the display unit 15) is arranged at the front of a casing, and, at the opposite face, which is the back of the casing, an imaging device is provided. The imaging device is set up so that the center direction of the angle of view coincides with the normal direction of a face of the display. The above three axis directions are set such that, in the information processing device 1, the horizontal direction of the display is a first axis direction, the vertical direction of the display is a second axis direction, and the center direction of the angle of view of the imaging device is a third axis direction.

For example, the content generation unit 17 sets the inclinations of the three axis directions as the rotational coordinates. By setting a value for each numerical range of rotation information for each of the three axis directions, the content generation unit 17 also sets a value corresponding to the range in which the inclination indicated by the acquired rotation information is included, as a rotation coordinate. For example, if the recognition accuracy of a sensor is low, the latter setting way may be to be employed.

Figure 10A:
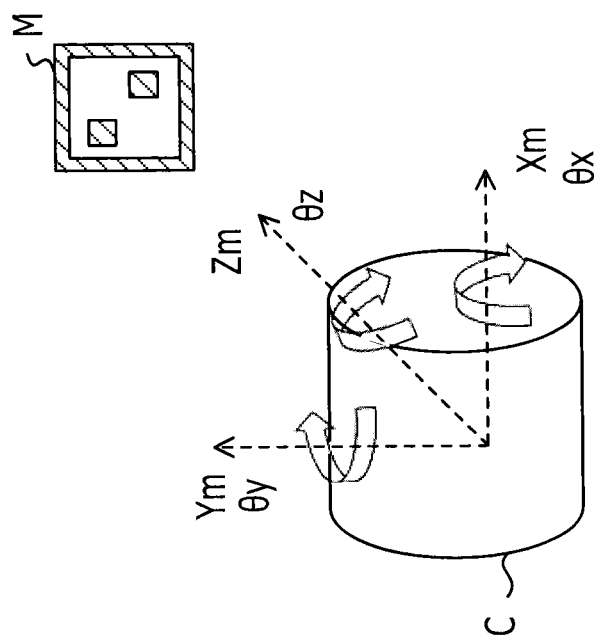
FIG. 10A and FIG. 10B are illustrations for explaining the relationship between the rotation information and the attitude information.
Figure 10B:
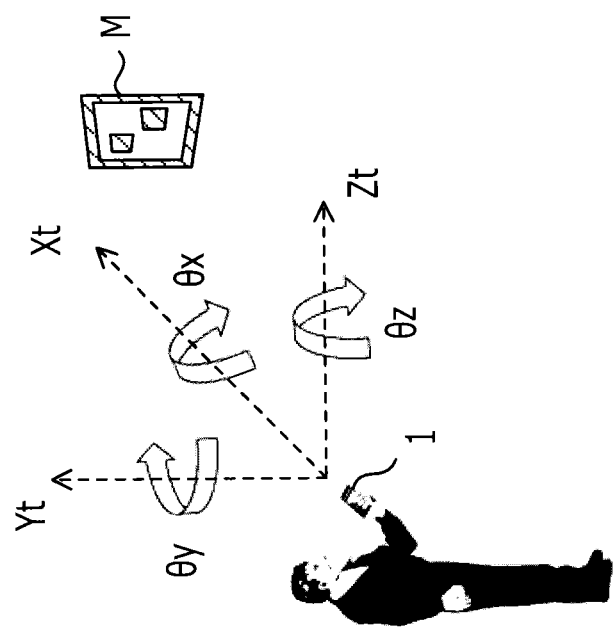

FIG. 10A and FIG. 10B are illustrations for explaining the relationship between the rotation information and the attitude information. FIG. 10A is an illustration for explaining rotation information. The authoring operator possesses the information processing device 1 and captures an image of the marker M by using the information processing device 1.

The recognition unit 16 recognizes the marker M from an image and acquires the marker ID of the marker M. Upon acceptance of input for starting authoring from the operator, the content generation unit 17 generates AR content and associates the recognized marker with the AR content.

Here, the operator gives rotation to the information processing device 1. Then, the measurement unit 13 measures the amount of rotation ($\theta x$, $\theta y$, $\theta z$) for each of the three axis directions (Xt, Yt, Zt) set with respect to the information processing device 1. Note that the amount of rotation ($\theta x$, $\theta y$, $\theta z$) is exemplary rotation information. Additionally, although the three axis directions (Xt, Yt, Zt) set as a reference in the measurement unit 13 do not have to but may coincide with three axes (Xc, Yc, Zc) forming the camera coordinate system with respect to an imaging device.

FIG. 10B is an illustration for explaining attitude information. As an initial value, rotational coordinates (0, 0, 0) relative to axes (Xm, Ym, Zm) constituting the marker coordinate system are assigned as an initial value to content C. Note that if an operator who visits the actual spot later adjusts attitude information simply set in the management device 3 and thereby AR content is finally created, the rotational coordinates given in the management device 3 are employed as an initial value.

Next, if the content generation unit 17 acquires an amount of rotation ($\theta x$, $\theta y$, $\theta z$), the amount of rotation ($\theta x$, $\theta y$, $\theta z$) is reflected in the axes (Xm, Ym, Zm) constituting the marker coordinate system. That is, attitude information ($\theta x$, $\theta y$, $\theta z$)) is set. Note that attitude information may be set in such a way that rotation information is added to an initial value. For example, when, on the assumption that the initial value is ($\theta x1$, $\theta y1$, $\theta z1$), the amount of rotation ($\theta x2$, $\theta y2$, θz2) is acquired, the content generation unit 17 sets attitude information (θx1+θx2, θy1+θx2, θz1+θz2).

Note that authoring operations for a plurality of pieces of content are performed in parallel, the content C in which attitude information is to be reflected is designated in advance by an operator. For the designated content C, the content generation unit 17 sets attitude information in which the amount of rotation (θx, θy, θz) is reflected.

Here, the measurement unit 13 (sensor) outputs rotation information to the content generation unit 17 at a predetermined time interval. Whenever acquiring rotation information, the content generation unit 17 may generate temporary attitude information based on the acquired rotation information. At this point, the image generation unit 18 generates a temporary combined image utilizing temporary attitude information, and outputs the generated image to the display unit 15. The authoring operator may confirm the state of AR content displayed in such a manner as to be overlaid at the current point in time.

Additionally, in the first embodiment, input for starting authoring and input for finishing authoring are accepted from the user. Note that if the recognition unit 16 has become unable to recognize the marker before accepting input for finishing authoring, the content generation unit 17 may discontinue generating attitude information or may continue thereafter.

Upon acceptance of input for finishing authoring, the content generation unit 17 generates final attitude information based on the rotation information at the time when input for finishing authoring is accepted. Additionally, temporary attitude information generated immediately before input for finishing authoring may be employed as the final attitude information.

The image generation unit 18 generates a combined image based on setting information and template information. Note that, the transformation matrix M generated by the recognition unit 16 is utilized for generating a combined image. Additionally, the image generation unit 18 generates various images other than the combined image. For example, an image for template selection in which a list of templates prepared in advance is displayed. Note that the image for template selection will be described later. The image generation unit 18 displays a generated image by controlling the display unit 15.

Next, various kinds of information will be described. FIG. 11 illustrates a marker management table. The marker management table stores marker management information. Note that the marker management information is information on a recognition result obtained from the figure of the marker contained in an input image. Upon recognition of the marker, the recognition unit 16 stores marker management information in the marker management table.

The marker management table manages information, such as the marker ID, coordinates (Xc, Yc, Zc, Pc, Qc, Rc) in the camera coordinate system, and a content addition flag for each of markers recognized by the recognition unit 16.

According to the marker management information, the marker ID of the marker in this embodiment is "M1", the position coordinates are (X1c, Y1c, Z1c), and the rotational coordinates are (P1c, Q1c, R1c). The content addition flag is information for identifying a marker for which content is to be added or updated. For example, when AR content associated with the marker of a marker ID "M1" is created, the content addition flag corresponding to the marker ID "M1" is set to "1".

FIG. 12 illustrates a template information table. The template information table stores template information for defining each template applied as model data of the AR object. The template information includes identification information of a template (template ID), coordinate information of each vertex T21 constituting the template, and configuration information (designation of the order of vertices and the texture ID) of each face T22 constituting the template.

The order of vertices indicates the order of vertices constituting a face. The texture ID indicates the identification information of a texture mapped to the face. The reference point of a template is, for example, the 0th vertex. Using the information indicated in the template information table, the shape and pattern of a three-dimensional model are defined.

FIG. 13 illustrates a setting information table. The AR content information table stores setting information on AR content. In the setting information table, the content ID of AR content, the position coordinates (Xm, Ym, Zm) in the marker coordinate system and the rotational coordinates (Pm, Qm, Rm) in the marker coordinate system of the reference point, the magnifications D (Jx, Jy, Jz) with respect to an AR template, the template ID of the AR template, the marker ID, and additional information are stored.

The position coordinates stored in the setting information table are coordinates in the marker coordinate system with respect to a marker identified by the marker ID stored in the same record as the position coordinates. Note that, upon acceptance of position designation indicating an arrangement position of AR content from the authoring operator, the content generation unit 17 transforms the position to coordinates in the marker coordinate system as desired, and stores the coordinates in the setting information table.

Additionally, in this embodiment, the content generation unit 17 generates attitude information based on the rotation information acquired from the measurement unit 13. That is, the content generation unit 17 generates rotational coordinates (Pm, Qm, Rm) as attitude information.

When the image generation unit 18 generates a projection image of the AR object E, the AR template illustrated in FIG. 13 is adjusted based on setting information (position, orientation, and size). That is, the position, attitude, and size of the AR object E are designated by setting information managed in the setting information table T3. Additionally, additional information is information added to the AR object E. As the additional information, text, access information to a Web page or a file, and so on are used.

For example, AR content whose content ID illustrated in FIG. 13 is "C1" includes vertices obtained in such a way that the coordinates of each vertex defined in an AR template of "T1" are extended in the respective Xm, Ym, and the Zm directions, are rotated by rotational coordinates (Pm1, Qm1, Rm1), and are translated in accordance with the position coordinates (Xm1, Ym1, Zm1). For the AR content, furthermore, additional information is mapped to a face constituting the AR object E.

As described earlier, the content generation unit 17 generates setting information and stores the setting information in the setting information table of the storage unit 14. Note that while the setting information table stores setting information on newly generated AR content, the setting information table may further store setting information generated in the past together therewith.

Note that the setting information generated in the past is acquired from the management device 3. For example, even at the time of creation of AR content, a combined image containing setting information created in the past for a marker with which AR content is considered to be newly associated is provided to the user. Accordingly, under the recognition of arrangement of the AR content generated in the past, the user who creates AR content may additionally create new AR content.

Figure 14:
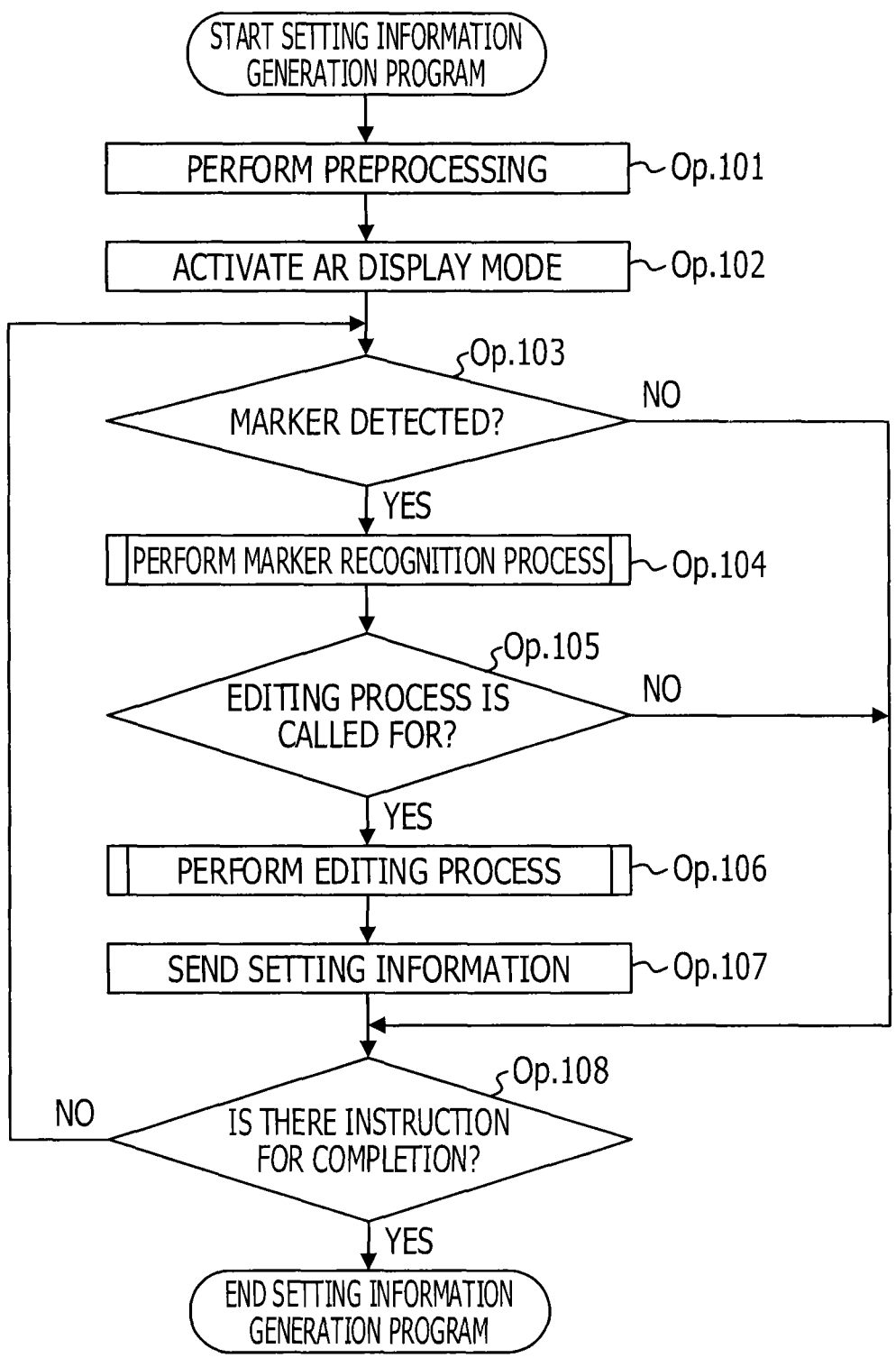
FIG. 14 illustrates the flow of a process performed by a position designation program.

Next, the flows of the various processes regarding this embodiment will be described. FIG. 14 illustrates the flow of a process performed by a position designation program. The setting information generation program is a program in which the procedure of the setting information generation process performed by the control unit 10 is defined.

Upon start of the setting information generation program, the control unit 10 performs preprocessing (Op. 101). In processing of Op. 101, template information and setting information generated in the past is acquired from the management device 3.

When the preprocessing of Op. 101 is performed, then the control unit 10 issues an instruction for activation of an AR display mode (Op. 102). In Op. 102, the control unit 10 causes, for example, the imaging unit 12 to start image capturing at predetermined time intervals and causes the recognition unit 16 to start marker detection processing for a captured image. Furthermore, the control unit 10 causes the display unit 15 to display a captured image taken by the imaging unit 12.

When instructed from the control unit 10 to capture an image, the imaging unit 12 acquires an image generated by using an image device, at a predetermined time interval, and stores the acquired image in the storage unit 14. The storage unit 14 is provided with a buffer that stores a plurality of images, and images taken by the imaging unit 12 are stored in the buffer. For example, the buffer provided in the storage unit 14 is a display buffer in which images that the display unit 15 will display are stored. Images stored in the display buffer are sequentially displayed on the display unit 15.

The recognition unit 16 acquires an image stored in the buffer provided in the storage unit 14 and determines whether the feature of a marker is contained in the acquired image (Op. 103). For example, the recognition unit 16 performs template matching using a template that defines the shape of a marker, thereby recognizing the marker. The recognition unit 16 may perform detection processing for one image of a predetermined number of images stored in the buffer.

Additionally, the recognition unit 16 reads the marker ID of the marker. Reading of the marker ID is performed, for example, based on information on the luminance within an image region corresponding to the marker. For example, in the case where a marker has a quadrangular shape, for regions obtained by dividing a quadrangular image region recognized as the marker frame, a region where the luminance has a value equal to or more than a predetermined value is set to "1" and a region where the luminance has a value less than the predetermined value is set to "0", and it is determined for each of the regions in a predetermined order whether that region is "1" or "0", and a column of information obtained by the determination is set as the marker ID.

Additionally, for example, under the condition that an arrangement of regions where the luminance has a value equal to or more than a predetermined value and regions where the luminance has a value less than the predetermined value, in a quadrangular frame, is set as a pattern, a marker ID corresponding to the pattern may be used. Furthermore, if the numerical range employed as a marker ID is determined in advance and the read marker ID is not within the numerical range, it may be determined that the marker ID has not been read.

The recognition unit 16 stores the read marker ID in the marker management table stored in the storage unit 14. Furthermore, the recognition unit 16 notifies the control unit 10 of the position coordinates (screen coordinate system) of the figure of the marker.

If the recognition unit 16 has detected the marker (Op. 103: YES), then a marker recognition process is performed (Op. 104). If the recognition unit 16 has not detected the marker (Op. 103: NO), it is determined whether an instruction for completion of the program has been given (Op. 108). If an instruction for completion has not been given (Op. 108: NO), the control unit 10 determines whether the marker has been detected or not (Op. 103).

Figure 15:
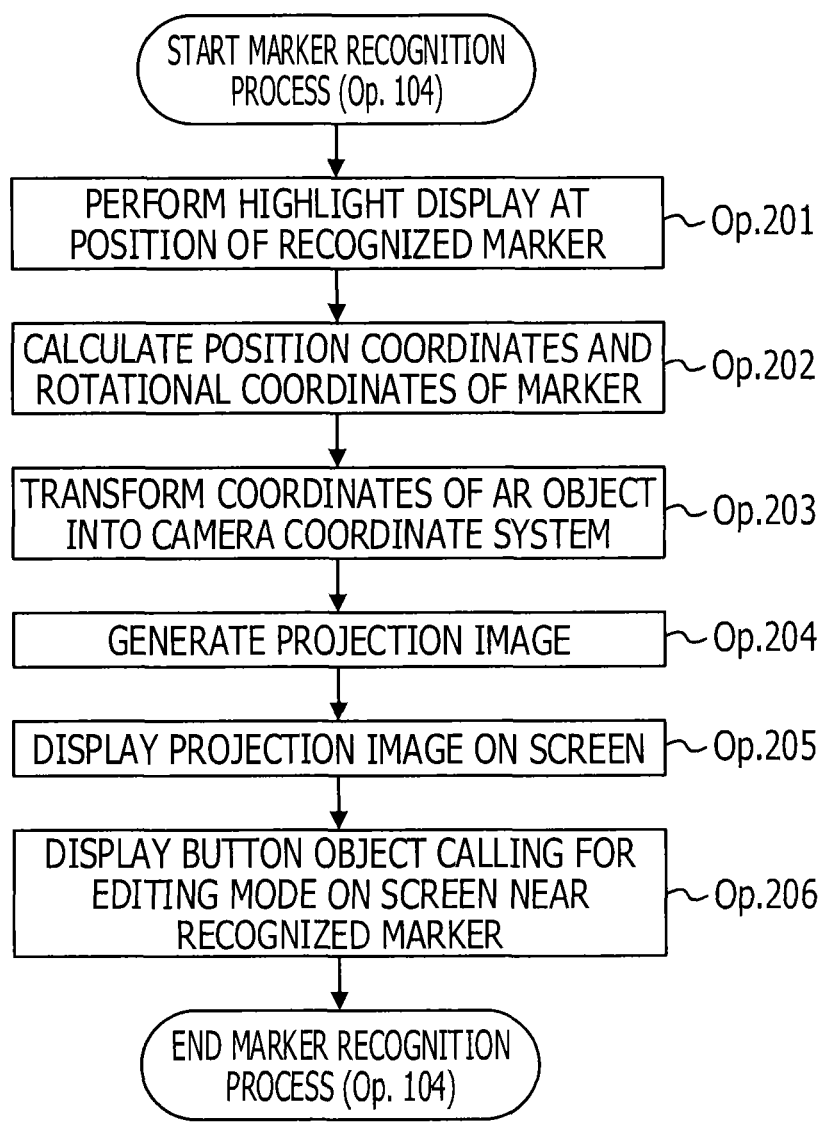
FIG. 15 illustrates an example of a processing procedure of a marker recognition process.

FIG. 15 illustrates an example of a processing procedure of the marker recognition process. Upon start of the marker recognition process, under an instruction from the recognition unit 16, the image generation unit 18 makes a highlight (highlight display) indicating the existence of a marker at a position where the recognized marker is displayed within a display screen of the display unit 15 (Op. 201). Highlighting is performed, for example, by displaying a quadrangular frame at a position where a marker is displayed, and plays a role of notifying the user of detection of the marker.

The recognition unit 16 notifies the image generation unit 18 of the position coordinates (screen coordinate system) of the marker. The image generation unit 18 combines an image to be displayed in the display unit 15 (an image in the display buffer) with a highlighting shape, at a position in accordance with the notification from the recognition unit 16. The highlighting shape is, for example, a display element such as a quadrangular red frame.

When processing of Op. 201 is performed, then the recognition unit 16 calculates the position and rotational coordinates of the marker (Op. 202). That is, information for generating the transformation matrix M is calculated. Based on the figure of the marker detected in Op. 103, the recognition unit 16 calculates the position and rotational coordinates (camera coordinate system) of the marker. The position and rotational coordinates (camera coordinate system) of the marker are calculated, for example, based on the shape of the figure of the marker and the position thereof in the image. The calculated position and rotational coordinates (camera coordinate system) are stored in the marker management table.

Next, the image generation unit 18 performs processing of displaying AR content associated with a marker registered in the marker management table (Op. 203, Op. 204, Op. 205). Note that processing of displaying AR content is performed if AR content (AR content created in the past) associated with the recognized marker is acquired from the management device 3. AR content created in the past in association with the recognized marker is displayed. For example, AR content simply created on the side of the management device 3, or the like, is displayed. In contrast, if the AR content does not exist, processing of displaying AR content is omitted.

The image generation unit 18 searches for setting information including the marker ID registered in the marker management table among setting information registered in the setting information table. If AR content that meets the requirement exists, the image generation unit 18 acquires the setting information from the setting information table. Then, a template information table corresponding to a template ID included in the acquired setting information is read.

Then, the image generation unit 18 transforms the coordinates of each point of the AR object defined by the template information from the marker coordinate system to the camera coordinate system using the transformation matrix M (Op. 203). Then, the image generation unit 18 transforms the coordinates of each point of the AR object from the camera coordinate system to the screen coordinate system, thereby generating a projection image of the AR object (Op. 204).

When a projection image is generated for the AR object, the image generation unit 18 combines the projection image with a captured image in the display buffer (Op. 205). When processing of Op. 205 is performed, the control unit 10 causes the display unit 15 to display an editing start button (Op. 206). When processing of Op. 206 is performed, the control unit 10 completes the marker recognition process illustrated in FIG. 15, and returns to processing of the flowchart of the position designation process illustrated in FIG. 14.

Subsequently, the control unit 10 determines whether input to the editing start button is detected in a predetermined period of time after the editing start button has been displayed in Op. 206 (Op. 105). If input to the editing start button is detected (Op. 105: YES), the control unit 10 performs an editing process illustrated in FIG. 18 (Op. 106). If input to the editing start button is not detected in the predetermined period of time (Op. 105: NO), the control unit 10 determines whether the control unit 10 is instructed to complete the program (Op. 108).

Figure 16:
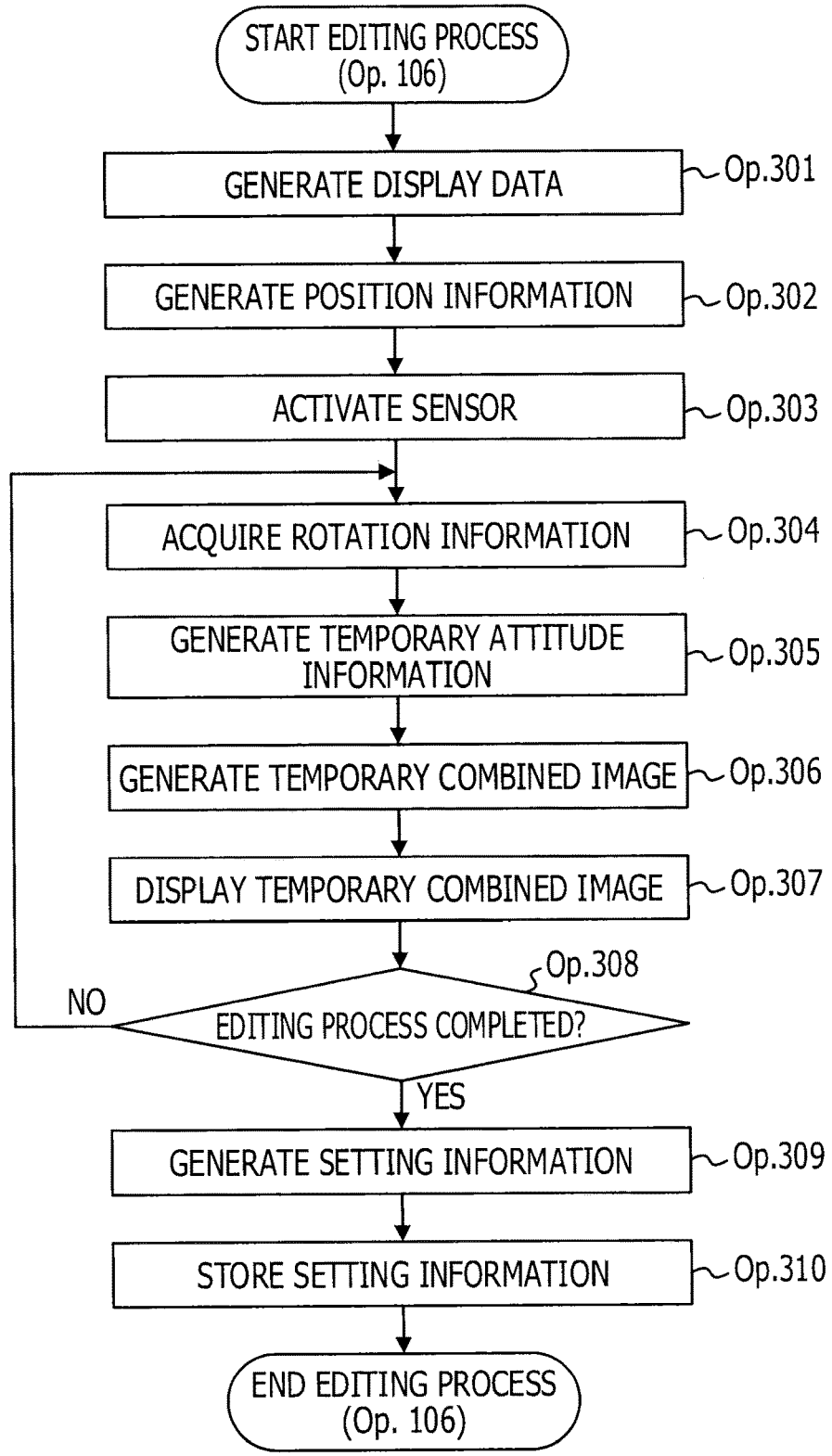
FIG. 16 illustrates an example of a processing procedure of an editing process.

FIG. 16 illustrates an example of a processing procedure of the editing process. Note that the editing process is also called an attitude information generation process. Upon start of the editing process, the content generation unit 17 generates display data in accordance with input from the authoring operator (Op. 301). For example, ahead of processing in Op. 301, the image generation unit 18 displays a template selection screen. Based on the template selected by the operator, the content generation unit 17 generates display data. Note that, here, input of magnification information, additional information, and so on may be accepted.

Next, the content generation unit 17 generates position information indicating the arrangement position of display data (AR object) (Op. 302). For example, position coordinates representing a coordinate value in the marker coordinate system corresponding to a position designated by the user are generated.

Note that, in the editing process, either of processing of editing position information and processing of editing attitude information, or both may be selectable by the user. For example, if the user selects the editing of position information, processing in Op. 302 is performed. Additionally, if the user selects the editing of attitude information, processing in Op. 303, Op. 304, Op. 305, Op. 306, and Op. 307 is performed. Furthermore, if after generation of position information is completed, the user further selects the editing of attitude information, processing in and after Op. 303 may be performed after the processing in Op. 302. Note that the processing of editing position information may be performed after the processing of editing attitude information.

Next, the content generation unit 17 activates a sensor (Op. 303). That is, the content generation unit 17 activates the measurement unit 13. Then, the content generation unit 17 acquires rotation information from the measurement unit 13 (Op. 304). For example, rotation information (θx, θy, θz) indicating the attitude of the information processing device 1 relative to the reference axis in the measurement unit 13 is acquired.

The content generation unit 17 generates temporary attitude information based on the acquired rotation information (Op. 305). Next, the image generation unit 18 generates a temporary combined image using temporary setting information including temporary attitude information, display data, position information, and so on (Op. 306). Note that the temporary combined image is generated in a way similar to the way of generating a combined image described earlier. Additionally, the temporary combined image is an image in which a projection image of AR content based on temporary setting information is displayed in such a manner as to be overlaid on a captured image taken at a point in time when the editing process is called for (Op. 105: Yes) or at a point in time immediately close to the point in time when the editing process is called for.

The display unit 15 displays a temporary combined image (Op. 307). Next, the content generation unit 17 determines whether input of completion of the editing process is performed (Op. 308). For example, when input of completion is performed by the authoring operator, or when the marker has become unrecognized, the content generation unit 17 completes the editing process.

If the editing process is not completed (Op. 308: No), the content generation unit 17 acquires new rotation information and repeats processing of Op. 304 to Op. 307. Otherwise, if the editing process is completed (Op. 308: Yes), the content generation unit 17 regards temporary attitude information immediately before input of completion of the editing process, as the finally determined attitude information, and generate setting information (Op. 309). That is, setting information including attitude information, position information, display data, a marker ID, and so on is generated.

Next, the content generation unit 17 stores the setting information in the storage unit 14 (Op. 310). Then, the content generation unit 17 ends the editing process.

When processing of Op. 310 is performed, the control unit 10 completes the editing process illustrated in FIG. 16, and returns to processing of the flowchart of the setting information process illustrated in FIG. 14. Under control of the control unit 10, the communication unit 11 sends generated AR content information to the management device 3 (Op. 107). Note that the communication unit 11 may send the management device 3 only AR content information on the newly created AR content in the AR content information table in the storage unit 14.

Then, if the control unit 10 is instructed to complete the program in processing of Op. 108 (Op. 108: YES), the control unit 10 completes processing of the program. Otherwise, if the control unit 10 is not instructed to complete the program (Op. 108: NO), the control unit 10 returns to processing of Op. 103.

Figure 17:
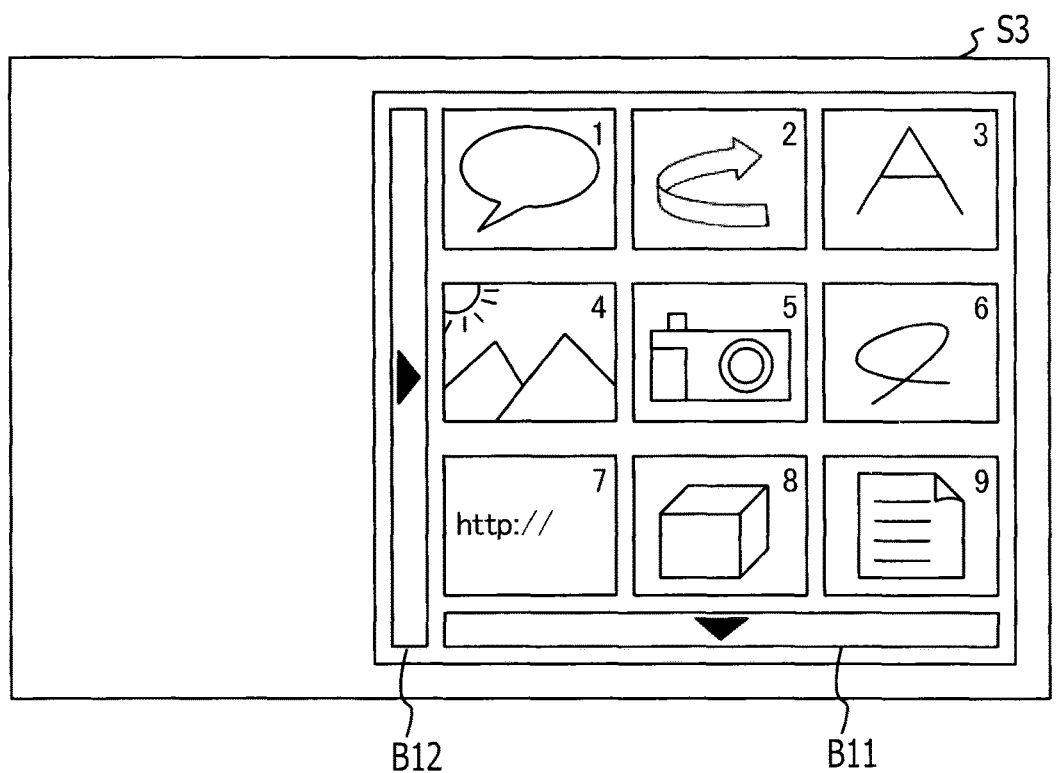
FIG. 17 illustrates an example of a template selection screen.

Here, a template selection screen is described. FIG. 17 illustrates an example of a template selection screen. In the processing of Op. 301 illustrated in FIG. 16, a template selection screen S3 is displayed. On the template selection screen, a group of buttons (a button 1 to a button 9) with which types of AR templates are selectable are displayed. In description of the template selection screen, the template selection screen is described in such a manner that buttons are identified based on numbers depicted in respective button regions. For example, a square button in which a number "1" is depicted is "button 1". Additionally, the template selection screen contains a group of selectable buttons other than the group of buttons depicted in FIG. 17, and contains a scroll button B11 for performing scroll operations for displaying those button groups. Additionally, the template selection screen contains a menu close button B12 for finishing selection of the AR template.

The buttons correspond to respective individual template IDs. That is, template information tables corresponding to respective buttons are provided. Upon input to any button, a template ID corresponding to the button is selected, and a template information table is activated based on the selected template ID.

A speech-bubble type of AR template is associated with the button 1. In the speech-bubble type of AR template, text information is added within a speech-bubble-shaped figure. An AR template with an arrow indicating a direction of rotation is associated with the button 2.

A text box type of AR template is associated with the button 3. In the text box type of AR template, text information is added to a quadrangular, frame-like figure. A picture type of AR template is associated with the button 4. In the picture type of AR template, image data is mapped within a quadrangular frame-like figure. An image file stored in the storage unit 14 is used as the image data.

An image-capturing type of AR template is associated with the button 5. The image-capturing type of AR template is an AR template similar to the picture type of AR template; however, these types differ in the source from which image data is acquired. When the image-capturing type of AR template is used, an image-capturing mode is activated, and image-capturing processing is performed by the imaging unit 12. Using the image-capturing type of AR template, image data captured by image-capturing processing is mapped within a quadrangular, frame-like figure. Image data mapped using the picture type of AR template and the image-capturing type of AR template may be static images or animations.

The button 6 is a handwriting type of AR template. The handwriting type of AR template is a quadrangular, transparent figure, and further the pattern of the figure is edited by a handwriting operation. The button 7 is a link type of AR template, and is a template similar to the text box type of AR template. Upon selection of the link type of AR template, a list of Web pages is displayed, and access information to a Web page selected from the list is added to the AR template. The list of Web pages is acquired, for example, from bookmarks and access history of a web browser.

The button 8 is associated with a figure type of AR template. A three-dimensional stereo model figure is defined in the figure type of AR template. For example, in response to input to the button 8, a screen display for selection of the shape of the stereo model figure may be performed. The shape of the stereo model figure is, for example, a cube, a rectangular parallelepiped, a cylinder, a sphere, a circular cone, a triangular prism, or the like. Additionally, in response to input to the button 8, computer-aided design (CAD) data may be activated. As the CAD data, for example, a file of CAD data stored in the storage unit 12 is selected.

The button 9 is associated with a file type of AR template. The file type of AR template is a quadrangular figure to which an icon image representing a file is mapped. Upon selection of the file type of AR template, a file in the storage unit 14 is selected, and a link to the selected file is added to the AR template.

As is described above, the information processing device 1 in this embodiment may set the attitude of AR content, based on rotation information on rotation of the information processing device 1. Accordingly, the authoring operator may perform authoring operations more sensuously.

Second Embodiment

In a second embodiment, rotation information is obtained based on images captured by an imaging device. Specifically, rotation information indicating the amount of rotation of an information processing device is calculated from a change in the figure of a marker between captured images. That is, an information processing device according to the second embodiment recognizes a first figure of a reference object from a first input image, recognizes a second figure of the reference object from a second input image captured later than the first input image, and generates rotation information based on the first figure and the second figure. The rotation information in the second embodiment is a difference between an image capturing direction when the first input image is captured and an image capturing direction when the second input image is captured.

Figure 18:
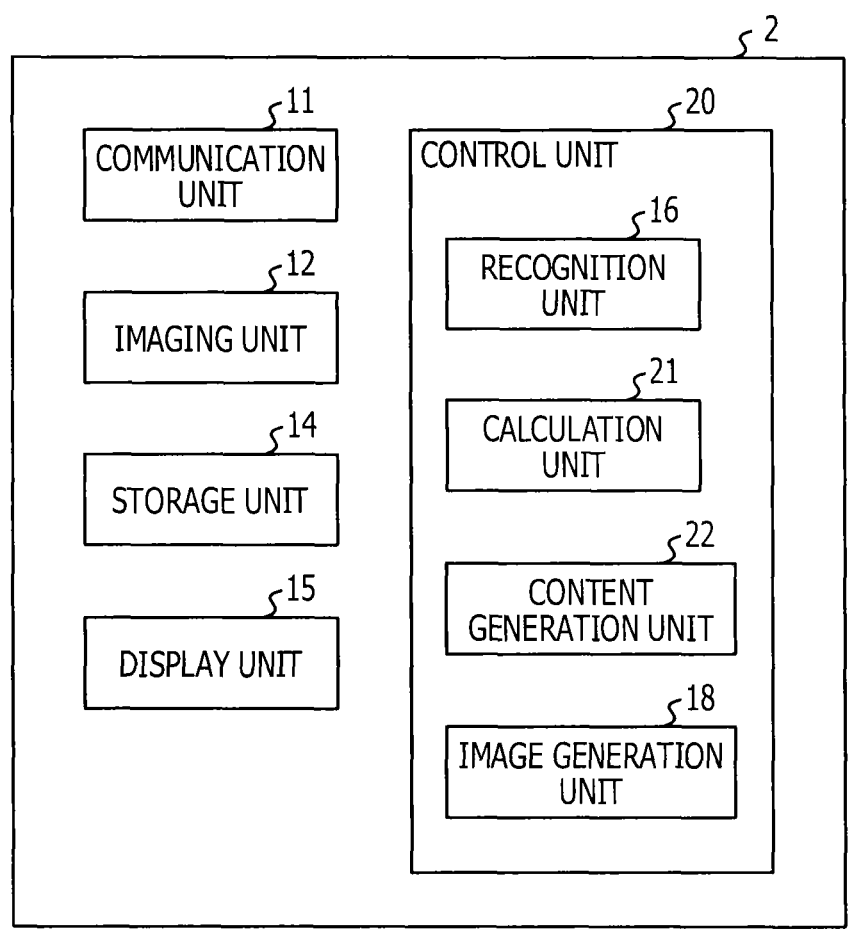
FIG. 18 is a functional block diagram of an information processing device according to a second embodiment.

FIG. 18 is a functional block diagram of an information processing device 2 according to the second embodiment. Note that processing units that perform processing similar to that of processing units according to the first embodiment are denoted by similar reference characters, and description thereof is omitted.

The information processing device 2 includes a control unit 20, the communication unit 11, the imaging unit 12, the storage unit 14, and the display unit 15. Note that the control unit 20 controls processing of the entire information processing device 2. The control unit 20 has the recognition unit 16, a calculation unit 21, a content generation unit 22, and the image generation unit 18.

The calculation unit 21 calculates rotation information from a plurality of input images in order to generate attitude information. That is, the calculation unit associates a feature point extracted from the first input image with a feature point extracted from the second input image. Then, the calculation unit 21 obtains amounts of rotation and motion of an imaging device from changes in the positions of the corresponding feature points.

Specifically, the amount of rotation of the information processing device 2 is calculated from a change in the figure of the reference object between the first input image and the second input image. The first input image is an image captured at a point of time when an editing process starts or at a point of time immediately close to the point of time of starting. The second input image is an image captured later than the first input image. For example, the second input image is an image captured at a point in time when completion of the editing process is input or an image captured at a point of time close to the point of time of completion.

Figure 19A:
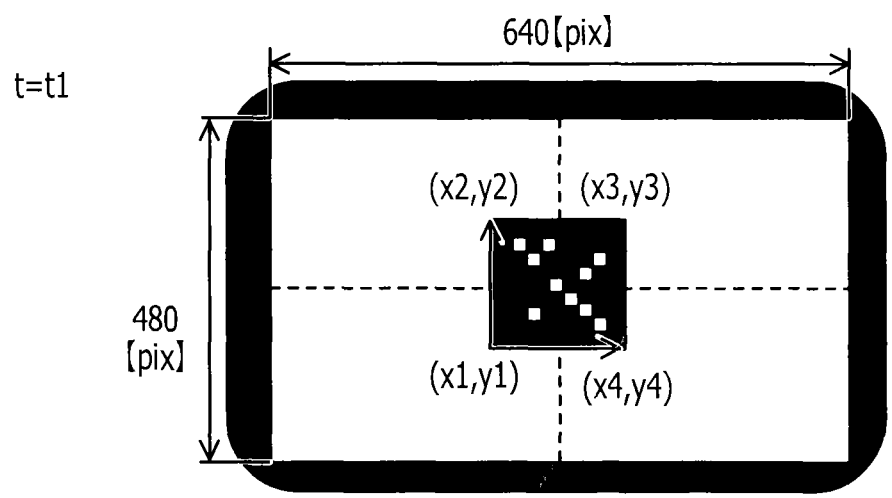
FIG. 19A and FIG. 19B are illustrations for explaining a method for calculating rotation information.
Figure 19B:
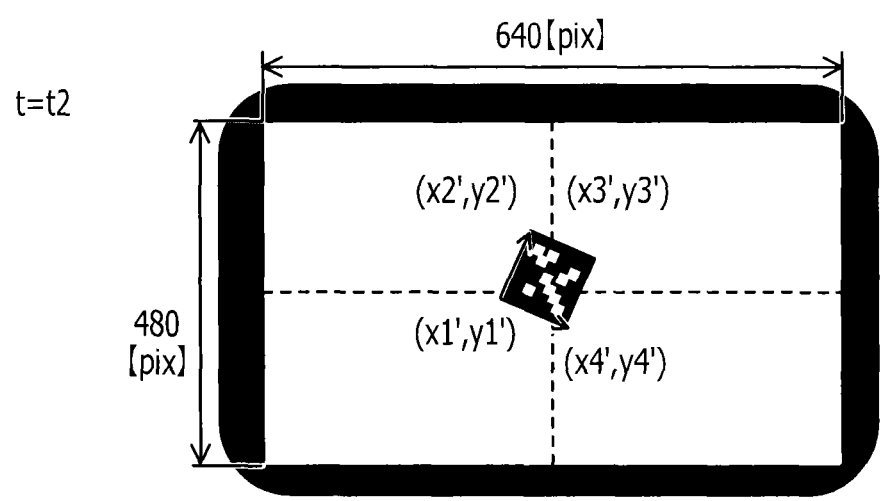

Here, a method for calculating rotation information is described. FIG. 19A and FIG. 19B are illustrations for explaining a method for calculating rotation information. FIG. 19A contains a first input image and a figure of a marker in the first input image. FIG. 19B contains a second input image and a figure of the marker in the second input image.

First, upon recognition of a marker, the recognition unit 16 outputs information on the positions of preset feature points to the calculation unit 21. In this embodiment, the position coordinates of four angles of a marker are output to the calculation unit 21. For example, the calculation unit 21 acquires the coordinates (x1, y1), (x2, y2), (x3, y3), (x4, y4) of feature points in the first input image. Next, the calculation unit 21 obtains a vector corresponding to each side of a marker for each axis direction (screen coordinate system) based on Formula 3 and Formula 4 given below.

$$\vec{x} = (x4-x1, y4-y1) \tag{Formula 3}$$

$$\vec{y} = (x2-x1, y2-y1) \tag{Formula 4}$$

Furthermore, based on each vector in the screen coordinate system, the vector in the z-axis direction is determined by an outer product calculation according to Formula 5 given below.

$$\vec{z} = \vec{x} \times \vec{y} \cdot \sin 90° = \vec{x} \times \vec{y} \qquad \text{(Formula 5)}$$

Next, when coordinates (x1', y1'), (x2', y2'), (x3', y3'), (x4', y4') of feature points in the second input image are acquired, the vectors in axis directions in the second input image are obtained from Formula 6, Formula 7, and Formula 8 given below. Note that a pattern for calibration may be provided at a predetermined position of the marker. For example, adding the pattern at a lower right position of the marker enables feature points in the first input image to be associated with feature points in the second input image even when the information processing device rotates by 180 degrees between the images.

$$\vec{x}' = (x4'-x1', y4'-y1') \qquad \text{(Formula 6)}$$

$$\vec{y}' = (x2'-x1', y2'-y1') \qquad \text{(Formula 7)}$$

$$\vec{z}' = \vec{x}' \times \vec{y}' \cdot \sin 90° = \vec{x}' \times \vec{y}' \qquad \text{(Formula 8)}$$

Utilizing vectors obtained respectively from the first input image and the second input image, the calculation unit 21 determines elements of an amount of rotation (θx, θy, θz) of the information processing device based on Formula 9, Formula 10, and Formula 11 given below, respectively. Note that the amount of rotation is exemplary rotation information.

$$\theta_x = \cos^{-1}\{(\vec{x}-\vec{x}')/|\vec{x}|-|\vec{x}'|\} \qquad \text{(Formula 9)}$$

$$\theta_y = \cos^{-1}\{(\vec{y}-\vec{y}')/|\vec{y}|-|\vec{y}'|\} \qquad \text{(Formula 10)}$$

$$\theta_z = \cos^{-1}\{(\vec{z}-\vec{z}')/|\vec{z}|-|\vec{z}'|\} \qquad \text{(Formula 11)}$$

The content generation unit 22 generates attitude information based on the rotation information calculated by the calculation unit 21. For example, as in the first embodiment, the amount of rotation, which is exemplary rotation information, is reflected in the rotational coordinates, which are exemplary attitude information. Additionally, as in the first embodiment, attitude information is information representing the inclination to each axis constituting the marker coordinate system. Then, the content generation unit 22 generates setting information including attitude information, position information, and so on.

Figure 20:
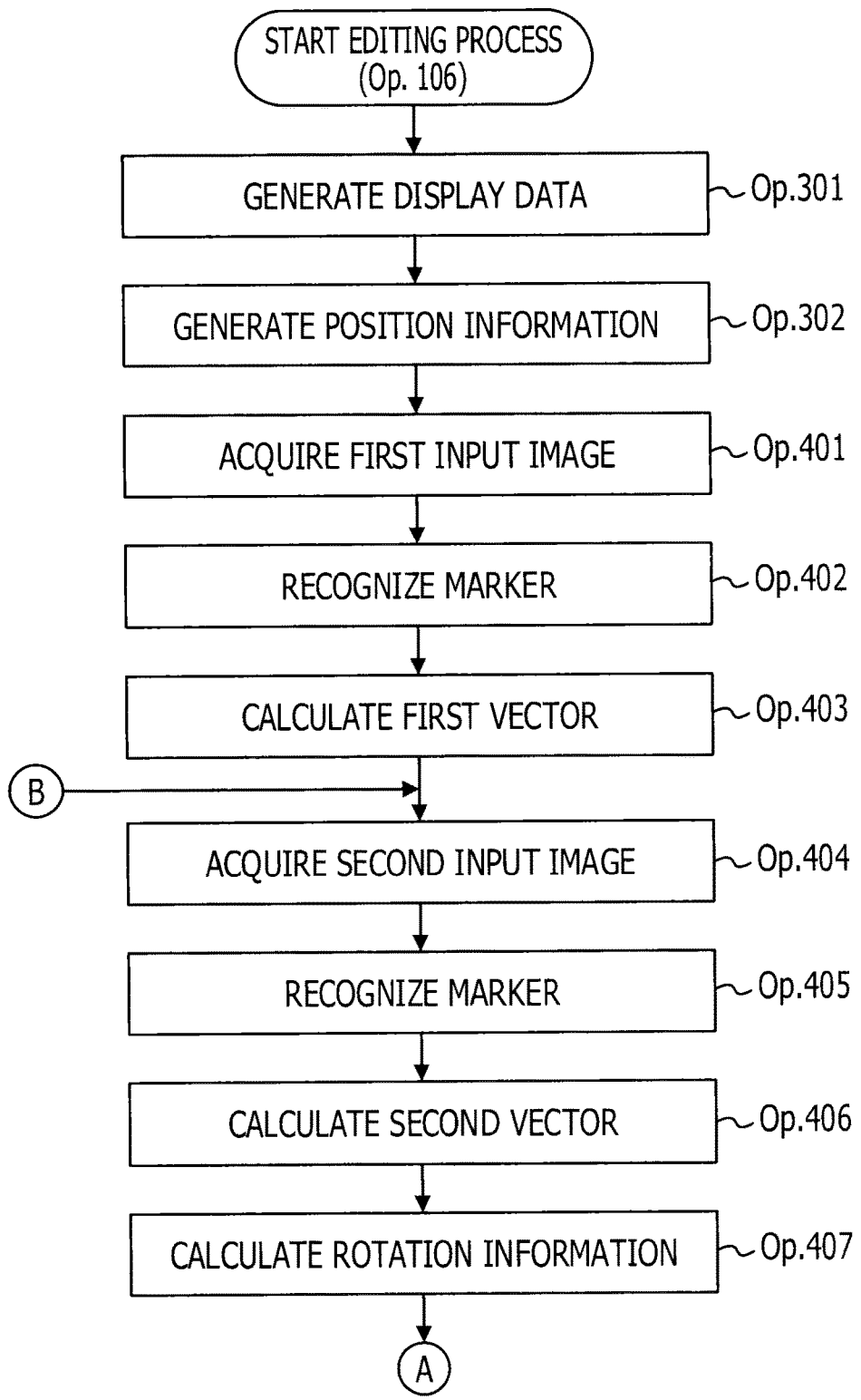
FIG. 20 illustrates a processing procedure example (1) of the editing process.
Figure 21:
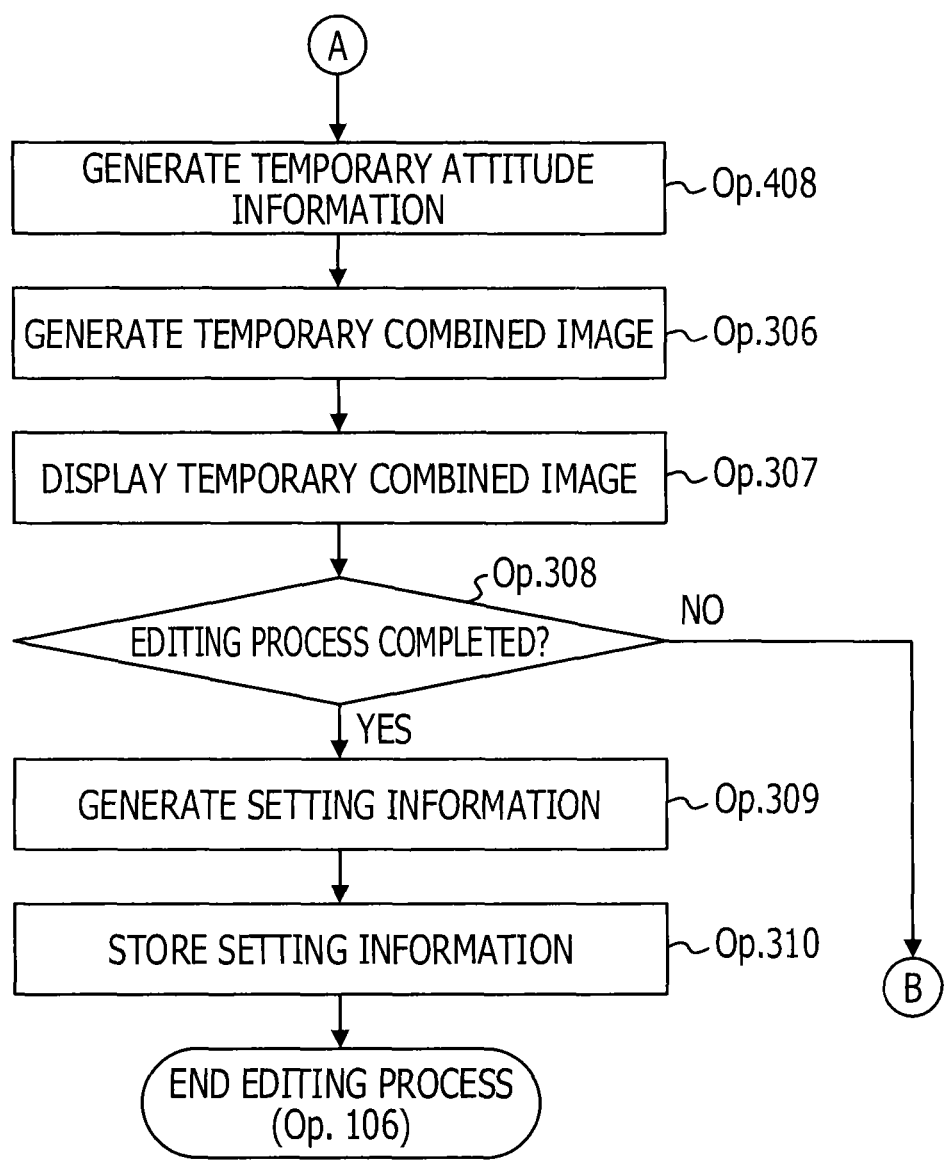
FIG. 21 illustrates the processing procedure example (2) of the editing process.

Next, the editing process according to the second embodiment is described using FIG. 20 and FIG. 21. FIG. 20 and FIG. 21 illustrate a processing procedure example of the editing process. Note that processing procedures of processes other than the editing process are similar to those in the first embodiment. That is, the processes illustrated in FIG. 14 and FIG. 15 are performed.

In FIG. 14, when the editing process is called for (Op. 105: Yes), the control unit 20 performs the editing process illustrated in FIG. 20. Note that the process similar to the editing process in the first embodiment is denoted by similar reference characters, and description thereof is omitted. Also as in the first embodiment, furthermore, either of editing processing of position information and editing processing of attitude information, or both may be selectable by the user.

First, upon start of the editing process, the content generation unit 22 generates display data in accordance with input from the authoring operator (Op. 301). Next, the content generation unit 22 generates position information indicating the arrangement position of display data (AR object) (Op. 302).

Next, the recognition unit 16 acquires the first input image from the imaging unit 12 (Op. 401). Note that the first input image is an image captured at a point of time when the editing process starts or at a point of time immediately close to the point of time of the starting. Then, the figure of a reference object is recognized from the first input image (Op. 402). For example, the marker is recognized. Note that if a marker is unable to be recognized at this point of time, a configuration in which an error message or the like is output may be used.

Next, the calculation unit 21 calculates a first vector based on the coordinates of feature points of the marker in the first input image (Op. 403). Next, the recognition unit 16 acquires the second input image captured later than the first input image (Op. 404).

Then, as in Op. 402, the recognition unit 16 recognizes a marker from the second input image (Op. 405). Then, as in Op. 403, the calculation unit 21 calculates a second vector based on coordinates of feature points of the marker in the second input image (Op. 406).

Then, the calculation unit 21 calculates rotation information indicating the amount of rotation of the information processing device 2, based on the first vector and the second vector (Op. 407). Note that various kinds of processing in Op. 403, Op. 406, and Op. 407 are performed, for example, using the method described with reference to FIG. 19A and FIG. 19B.

Next, the content generation unit 22 generates temporary attitude information based on the calculated rotation information (Op. 408). Next, the image generation unit 18 generates a temporary combined image using temporary setting information including temporary attitude information, display data, position information, and so on (Op. 306). The display unit 15 displays a temporary combined image (Op. 307).

Next, the content generation unit 22 determines whether completion of the editing process is input (Op. 308). For example, if input of completion is performed by the authoring operator, the content generation unit 22 completes the editing process. Additionally, if the marker has become unrecognized, it is impossible to acquire an input image containing the marker and therefore the content generation unit 22 completes the editing process.

If the editing process is not completed (Op. 308: No), the content generation unit 22 acquires a new second input image (Op. 404) and repeats processing of Op. 405 to Op. 408 and Op. 306 to 308. That is, the content generation unit 22 obtains a new second vector without destroying the first vector obtained from the first input image, thereby calculating new rotation information.

Otherwise, if the editing process is completed (Op. 308: Yes), the content generation unit 22 generates setting information on the assumption that temporary attitude information immediately before inputting of the completion of the editing process is finally determined attitude information (Op. 309). That is, setting information including attitude information, position information, display data, a marker ID, and so on is generated. Next, the content generation unit 22 stores the setting information in the storage unit 14 (Op. 310). Then, the content generation unit 22 completes the editing process.

As described above, the information processing device 2 according to this embodiment may calculate the rotation information of itself based on images. Then, attitude information may be generated based on the calculated rotation information. Accordingly, even with the information processing device 2 that is not provided with an instrument such as a sensor, for example, the authoring operator may easily perform authoring of AR content by merely adding rotation to the information processing device that the authoring operator possesses.

[Example of Hardware Configuration]

Figure 22:
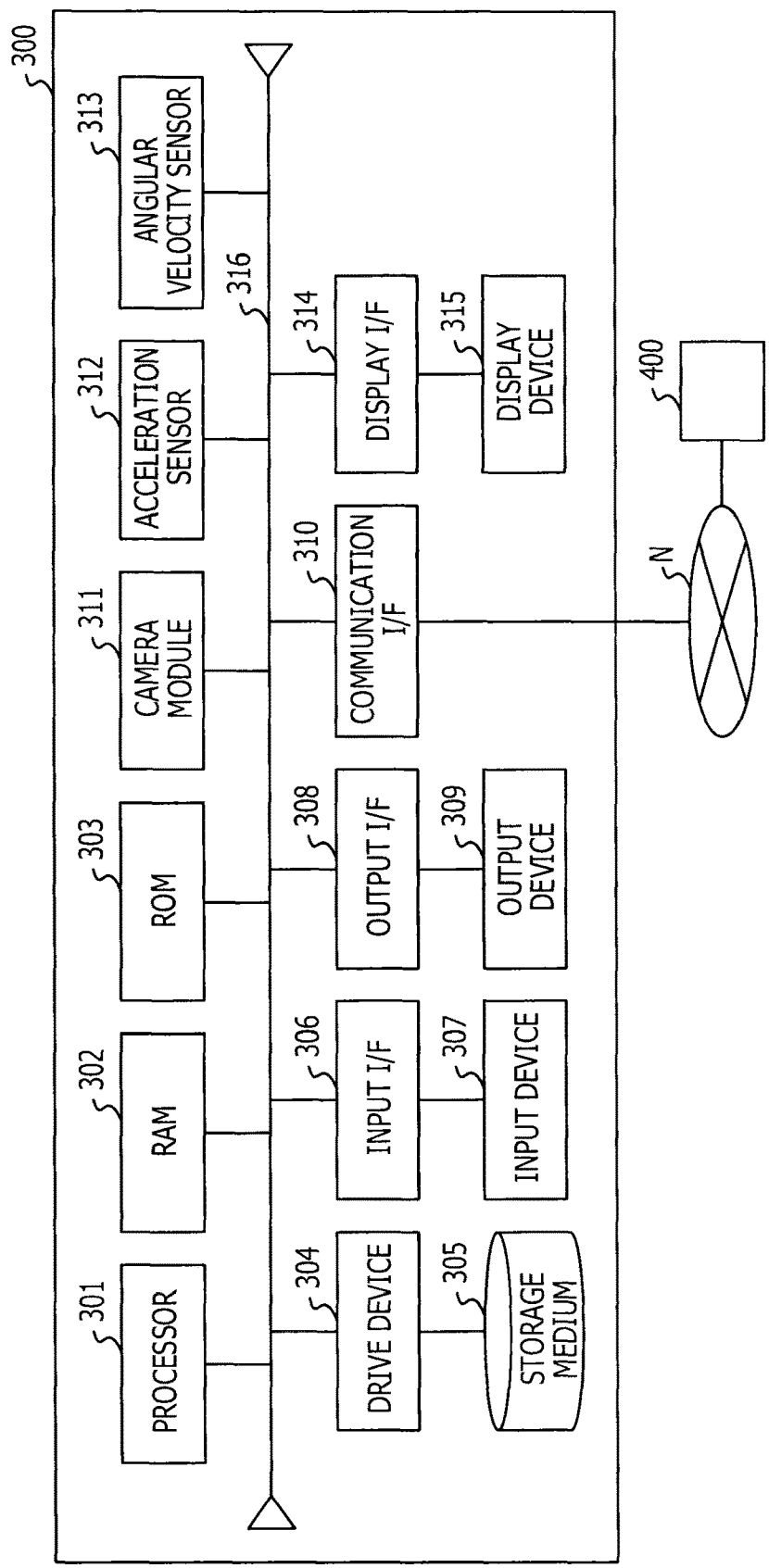
FIG. 22 illustrates an example of a hardware configuration of the information processing device of each embodiment.

The hardware configuration of the information processing device 1 or 2 and the management device 3 illustrated in each embodiment will be described. FIG. 22 illustrates an example of a hardware configuration of the information processing device of each embodiment. The information processing device 1 or 2 in each embodiment is implemented by a computer 300. The functional blocks illustrated in FIG. 9 and FIG. 18 are implemented, for example, by the hardware configuration illustrated in FIG. 22. The computer 300 includes, for example, a processor 301, a random access memory (RAM) 302, a read only memory (ROM) 303, a drive device 304, a storage medium 305, an input interface (input I/F) 306, an input device 307, an output interface (output I/F) 308, an output device 309, a communication interface (communication I/F) 310, a camera module 311, an acceleration sensor 312, an angular velocity sensor 313, a display interface (display I/F) 314, a display device 315, a bus 316, and so on. Each piece of hardware is connected through the bus 316.

The communication interface 310 controls communication over the network 3. Communication controlled by the communication interface 310 may be in a manner of accessing the network N through a wireless base station utilizing wireless communication. An example of the communication interface 310 is a network interface card (NIC). The input interface 306 is connected to the input device 307, and transmits an input signal received from the input device 307 to the processor 301. The output interface 308 is connected to the output device 309, and causes the output device 309 to perform output in accordance with an instruction of the processor 301. An example of the input interface 306 and the output interface 308 is an input/output (I/O) controller.

The input device 307 is a device that sends an input signal in response to an operation. The input device 307 is, for example, a key device such as a keyboard or a button attached to the main body of the computer 300, or a pointing device such as a mouse or a touch panel. The output device 309 is a device that outputs information in accordance with control of the processor 301. The output devices 309 is, for example, a sound output device such as a speaker.

The display interface 314 is connected to the display device 315. The display interface 314 causes the display device 315 to display image information that has been written to a display buffer provided in the display interface 314 by the processor 301. An example of the display interface 314 is a graphics card or a graphics chip. The display device 315 is a device that outputs information in accordance with control of the processor 301. As the display device 315, an image output device such as a display, a transmissive display, or the like is used.

In the case where a transmissive display is used, a projection image of AR content may be, for example, controlled to be displayed at a suitable position in the transmissive display rather than to be combined with a captured image. This allows the user to obtain visual perception of a state in which the real space and AR content coincide with each other. Additionally, for example, an input-output device, such as a touch screen, is used as the input device 307 as well as the display device 315. Additionally, instead of the input device 307 as well as the display device 315 integrated inside the computer 300, the input device 307 as well as the display device 315 may be connected to the computer 300 from outside thereof, for example.

The RAM 302 is a readable and writable memory device, and a semiconductor memory such as a static RAM (SRAM) or a dynamic RAM (DRAM), or a flash memory other than the RAM, for example, may be used. Examples of the ROM 303 include a programmable ROM (PROM).

The drive device 304 is a device that performs at least either of reading and writing of information stored in a storage medium 305. The storage medium 305 stores information written by the drive device 304. The storage medium 305 is, for example, at least one of kinds of storage media, such as a hard disk, a solid state drive (SSD), a compact disc (CD), a digital versatile disc (DVD), and a blu-ray disc. Additionally, for example, the computer 300 includes the drive device 304 corresponding to the kind of the storage medium 305 in the computer 300.

The camera module 311 includes an imaging device (image sensor), and, for example, and writes data obtained through photoelectric conversion performed by the imaging device to an input-image image buffer included in the camera module 311. The acceleration sensor 312 measures an acceleration that acts on the acceleration sensor 312. The angular velocity sensor 313 measures an angular velocity of an operation performed by the angular velocity sensor 313.

The processor 301 reads a program stored in the ROM 303 or the storage medium 305 to the RAM 302 and performs processing according to the procedure of the read program. For example, the functions of the control unit 10 are implemented in such a way that the processor 301 controls other hardware based on the setting information generation program illustrated in FIG. 14, FIG. 15, FIG. 16, FIG. 20, and FIG. 21. The functions of the communication unit 11 are implemented in such a way that the processor 301 controls the communication interface 310 to perform data communication and to store received data in the storage medium 305.

The functions of the storage unit 14 are implemented in such a way that the ROM 303 and the storage medium 305 store a program file and a data file, and that the RAM 302 is used as a work area of the processor 301. For example, setting information, template information, and so on are stored in the RAM 302.

The functions of the imaging unit 12 are implemented in such a way that the camera module 311 writes image data to the input-image image buffer and that the processor 301 reads image data in the input-image image buffer. In a monitoring mode, for example, image data is written to the input-image image buffer and is concurrently written to a display buffer of the display device 315.

Additionally, the functions of the display unit 15 are implemented in such a way that image data generated by the processor 301 is written to the display buffer included in the display interface 314 and that the display device 315 displays image data in the display buffer.

Figure 23:
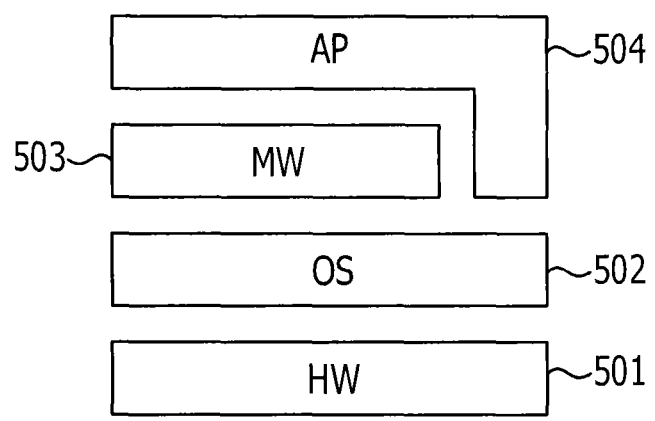
FIG. 23 illustrates an example of a configuration of programs that operate on a computer.

Next, FIG. 23 illustrates an example of a configuration of programs that operate on the computer 300. On the computer 300, an operating system (OS) 502 that controls a hardware group operates. The processor 301 operates in a procedure in accordance with the OS 502 to perform control and management of hardware (HW) 501, so that processing by an application program (AP) 504 or middleware (MW) 503 is performed on the HW 501.

On the computer 300, programs such as the OS 502, the MW 503, and the AP 504 are, for example, read to the RAM 302 and are executed by the processor 301. Additionally, the AR control program including the setting information generation program illustrated in each embodiment is, for example, a program activated as the MW 503 from the AP 504.

Alternatively, for example, the AR control program including the setting information generation program is a program that implements the AR function as the AP 504. The AR control program is stored in the storage medium 305. The storage medium 305 in such a state that the setting information generation program according to the present embodiments is singly stored or the AR control program including the setting information generation program is stored may be circulated separately from the main body of the computer 300.

Figure 24:
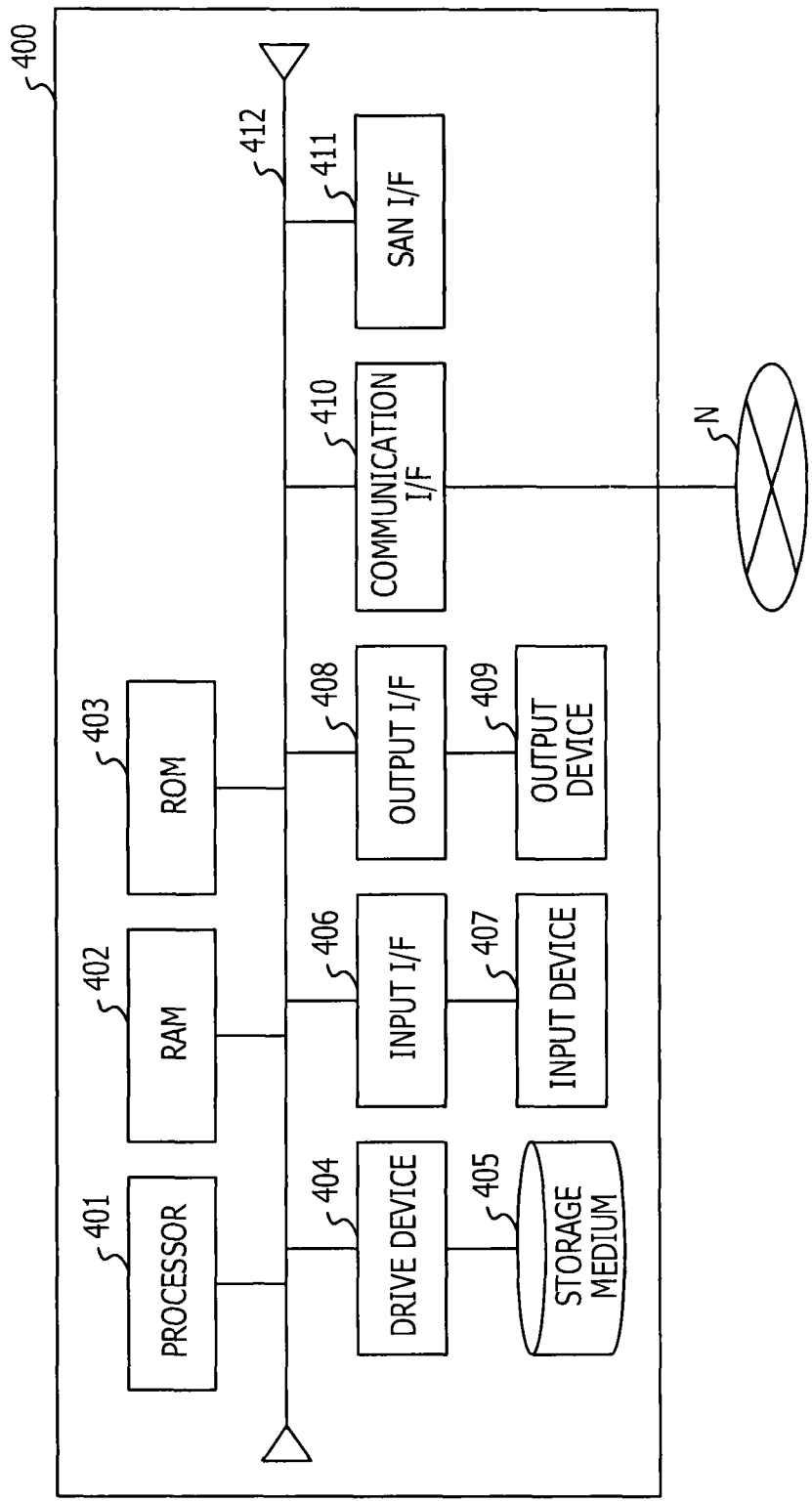
FIG. 24 is an example of a hardware configuration of a management device of each embodiment.

Next, a hardware configuration of the management device 3 in each embodiment will be described. FIG. 24 is an example of a hardware configuration of the management device of each embodiment. The management device 3 is implemented by a computer 400. The management device 3 is implemented, for example, by the hardware configuration illustrated in FIG. 24. The computer 400 includes, for example, a processor 401, a RAM 402, a ROM 403, a drive device 404, a storage medium 405, an input interface (input I/F) 406, an input device 407, an output interface (output I/F) 408, an output device 409, a communication interface (communication I/F) 410, a storage area network (SAN) interface (SAN I/F) 411, a bus 412, and so on. Each piece of hardware is connected through the bus 412.

For example, the processor 401 is hardware similar to the processor 301. The RAM 402 is, for example, hardware similar to the RAM 302. The ROM 403 is, for example, hardware similar to the ROM 303. The drive device 404 is, for example, hardware similar to the drive device 304. The storage medium 405 is, for example, hardware similar to the storage medium 305. The input interface (input I/F) 406 is, for example, hardware similar to the input interface 306. The input device 407 is, for example, hardware similar to the input device 307.

The output interface (output I/F) 408 is, for example, hardware similar to the output interface (output I/F) 308. The output device 409 is, for example, hardware similar to the output device 309. The communication interface (communication I/F) 410 is, for example, hardware similar to the communication interface 310. The storage area network (SAN) interface (SAN I/F) 411 is an interface for connecting the computer 400 to the SAN and includes a host bus adapter (HBA).

The processor 401 reads a management program stored in the ROM 403 or the storage medium 405 to the RAM 402 and performs processing according to the procedure of the read management program. At that point, the RAM 402 is used as a work area of the processor 401. Note that the management program includes the setting information generation program according to the setting information generation process in the management device 3.

The ROM 403 and the storage medium 405 store a program file and a data file, or the RAM 402 is used as a work area of the processor 401, so that the management device 3 stores a various kinds of information. Additionally, the processor 401 controls the communication interface 410 to perform communication processing.

Note that the functional configuration of the management device 3 includes a communication unit configured to acquire, from an information processing device, setting information that associates attitude information indicating an arrangement attitude of display data arranged in a space with respect to a reference object generated based on rotation information on rotation of the information processing device, the display data, and identification information of the reference object; and a storage unit configured to store the acquired setting information. The management device 3 further includes a control unit configured to control various kinds of processing. The communication unit is implemented, for example, by the communication interface 410. The storage unit is implemented, for example, by the ROM 403 and the storage medium 405. Furthermore, the control unit is implemented, for example, by the processor 401.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention(s) has(have) been described in detail, it should be understood that the various changes, substitutions, and alterations could be made hereto without departing from the spirit and scope of the invention.

What is claimed is:

1. A setting method executed by a computer, comprising:
   acquiring first input image data;
   acquiring display data, to be associated with a reference object detected from the first input image data;
   generating attitude information indicating a display inclination of the display data based on rotation information related to a rotation operation of the computer by a user, the rotation information indicating an attitude of the computer relative to a reference axis in the computer;
   generating setting information in which the attitude information and the display data are associated with each other for each of a plurality of reference objects based on the generated attitude information;
   storing the generated setting information in a storage device;
   acquiring another input image data;
   determining whether the reference object is included in the another input image data;
   retrieving the attitude information and the display data corresponding to the reference object from the setting information in the storage device when it is determined that the reference object is included in the another input image data;
   acquiring position information of the reference object detected from the another input image data, the position information being different from the attitude information; and
   displaying the display data on the another input image data based on the attitude information and the position information so that the display data is displayed at an inclination corresponding to the display inclination retrieved from the setting information in the storage device generated using the first input image data.

2. The setting method according to claim 1, wherein the rotation information represents a magnitude of rotation between a first point in time when the reference object has been detected from the first input image data and a second point in time later than the first point in time.

3. The setting method according to claim 1, wherein the attitude information represents the display inclination of the display data relative to each reference axis of a three-dimensional space with respect to the reference object.

4. The setting method according to claim 1, further comprising:
acquiring a first figure data of the reference object from the first input image data, when the reference object is detected from the first input image data;
acquiring a second figure data of the reference object from a second input image data which is input later than the first input image data, when the reference object is detected from the second image data; and
specifying the attitude of the computer based on a difference between the first figure data and the second figure data.

5. The setting method according to claim 1, further comprising:
acquiring a first capturing direction of an imaging device at a first time when the first input image data is captured, the first input image data being captured by the imaging device which is installed on the computer;
acquiring a second capturing direction of the imaging device at a second time when a second input image data is captured, the second input image data being captured by the imaging device; and
specifying the attitude of the computer based on a difference between the first capturing direction and the second capturing direction.

6. The setting method according to claim 1, further comprising:
acquiring the attitude of the computer from a sensor that is installed on the computer and measures an inclination relative to the reference axis set in the computer.

7. The setting method according to claim 1, wherein the reference object is an augmented reality (AR) marker.

8. The setting method according to claim 1, further comprising:
initializing the acquiring the display data based on detecting the reference object from the first input image data.

9. The setting method according to claim 8, further comprising:
displaying an object for initializing editing the attitude information when detecting the reference object from the first input image data, wherein
the acquiring the display data is initialized when the object is operated by the user.

10. The setting method according to claim 1, further comprising:
displaying a template selection screen on a display of the computer, the template selection screen having a plurality of selectable display data, the plurality of selectable display data being stored in the storage device prior to a capturing of the first input image data, wherein
the acquiring includes acquiring the display data among the plurality of selectable display data.

11. The setting method according to claim 1, wherein setting information includes:
position coordinates and rotational coordinates of the display data relative to an origin of a marker included in the first input image data, and
magnifications with respect to the display data.

12. An information processing device comprising:
a memory; and
a processor coupled to the memory and configured to:
acquire first input image data,
acquire display data to be associated with a reference object detected from first input image data,
generate attitude information indicating a display inclination of the display data based on rotation information related to a rotation operation of the information processing device by a user, the rotation information indicating an attitude of the information processing device relative to a reference axis set in the information processing device,
generate setting information in which the attitude information and the display data are associated with each other for each of a plurality of reference objects based on the generated attitude information,
store the generated setting information in a storage device,
acquire another input image data,
determine whether the reference object is included in the another input image data,
retrieve the attitude information and the display data corresponding to the reference object from the setting information in the storage device when it is determined that the reference object is included in the another input image data,
acquire position information of the reference object detected from the another input image data, the position information being different from the attitude information, and
display the display data on the another input image data based on the attitude information and the position information so that the display data is displayed at an inclination corresponding to the display inclination retrieved from the setting information in the storage device generated using the first input image data.

13. The information processing device according to claim 12, wherein the rotation information represents a magnitude of rotation between a first point in time when the reference object has been detected from the first input image data and a second point in time later than the first point in time.

14. The information processing device according to claim 12, wherein the attitude information represents the display inclination of the display data relative to each reference axis of a three-dimensional space with respect to the reference object.

15. The information processing device according to claim 12, wherein the processor is further configured to:
acquire a first figure data of the reference object from the first input image data, when the reference object is detected from the first input image data;
acquire a second figure data of the reference object from a second input image data which is input later than the first input image data, when the reference object is detected from the second image data; and
specify the attitude of the information processing device based on a difference between the first figure data and the second figure data.

16. The information processing device according to claim 12, wherein the processor is further configured to:
acquire a first capturing direction of an imaging device at a first time when the first input image data is captured, the first input image data being captured by the imaging device which is installed on the information processing device;
acquire a second capturing direction of the imaging device at a second time when a second input image data is captured, the second input image being captured by the imaging device; and
specify the attitude of the information processing device based on a difference between the first capturing direction and the second capturing direction.

17. The information processing device according to claim 12, wherein the processor is further configured to:
acquire the attitude of the information processing device from a sensor that is installed on the information processing device and measures an inclination relative to the reference axis set in the information processing device.

18. A non-transitory computer-readable medium storing a setting program that causes a computer to execute a process, the process comprising:
acquiring first input image data;
acquiring display data, to be associated with a reference object detected from the first input image data;
generating attitude information indicating a display inclination of the display data based on rotation information related to a rotation operation of the computer by a user, the rotation information indicating an attitude of the computer relative to a reference axis set in the computer;
generating setting information in which the attitude information and the display data are associated with each other for each of a plurality of reference objects based on the generated attitude information;
storing the generated setting information in a storage device;
acquiring another input image data;
determining whether the reference object is included in the another input image data;
retrieving the attitude information and the display data corresponding to the reference object from the setting information in the storage device when it is determined that the reference object is included in the another input image data;
acquiring position information of the reference object detected from the another input image data, the position information being different from the attitude information; and
displaying the display data on the another input image data based on the attitude information and the position information so that the display data is displayed at an inclination corresponding to the display inclination retrieved from the setting information in the storage device generated using the first input image data.

* * * * *